United States Patent
Soda

(10) Patent No.: US 7,495,811 B2
(45) Date of Patent: Feb. 24, 2009

(54) IMAGE READING APPARATUS, IMAGE FORMING APPARATUS USING SAME, AND IMAGE READING METHOD

(75) Inventor: Kazunori Soda, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1027 days.

(21) Appl. No.: 10/461,099

(22) Filed: Jun. 13, 2003

(65) Prior Publication Data

US 2004/0012828 A1    Jan. 22, 2004

(30) Foreign Application Priority Data

Jul. 18, 2002    (JP) .............................. 2002-209775

(51) Int. Cl.
*H04N 1/04*    (2006.01)
(52) U.S. Cl. ...................... 358/474; 358/487; 358/1.15; 358/473; 358/442; 382/313; 382/314; 359/296; 359/298
(58) Field of Classification Search ................ 358/474, 358/501, 505, 1.15, 473, 496, 486, 487; 382/313, 382/314; 359/296, 298
See application file for complete search history.

(56) References Cited

U.S. PATENT DOCUMENTS

| | | | | |
|---|---|---|---|---|
| 4,714,940 A | * | 12/1987 | Inoue et al. | 399/6 |
| 5,083,313 A | * | 1/1992 | Reinsch | 382/270 |
| 5,134,661 A | * | 7/1992 | Reinsch | 382/100 |
| 5,724,064 A | * | 3/1998 | Stefik et al. | 345/105 |
| 6,640,007 B1 | * | 10/2003 | Niie et al. | 382/188 |
| 6,640,077 B2 | * | 10/2003 | Suzuki et al. | 399/303 |
| 6,987,503 B2 | * | 1/2006 | Inoue | 345/107 |
| 7,154,452 B2 | * | 12/2006 | Nakamura et al. | 345/1.1 |
| 2002/0105600 A1 | * | 8/2002 | Shimoda et al. | 348/739 |
| 2003/0020701 A1 | * | 1/2003 | Nakamura et al. | 345/204 |
| 2003/0137496 A1 | * | 7/2003 | Stevens et al. | 345/173 |
| 2006/0020469 A1 | * | 1/2006 | Rast | 704/270 |
| 2007/0257422 A1 | * | 11/2007 | Suzuki | 271/225 |
| 2008/0130070 A1 | * | 6/2008 | Walker et al. | 358/496 |

FOREIGN PATENT DOCUMENTS

| | | |
|---|---|---|
| JP | 02-008868 | 1/1990 |
| JP | 10-171620 | 6/1998 |
| JP | 2002-244583 | 8/2002 |

* cited by examiner

*Primary Examiner*—Aung S. Moe
*Assistant Examiner*—Negussie Worku
(74) *Attorney, Agent, or Firm*—Edwards Angell Palmer & Dodge LLP; David G. Conlin; William J. Daley, Jr.

(57) ABSTRACT

An image reading apparatus includes a display section for displaying image information by being subjected to a voltage and/or an electric field, a writing section for writing the image information into the display section, and a reading section for optically reading the image information displayed on the display section. As the display section, a flexible display section such as an electronic sheet is adopted in the image reading apparatus.

20 Claims, 15 Drawing Sheets

IMAGE READING APPARATUS, IMAGE FORMING APPARATUS USING SAME, AND IMAGE READING METHOD

FIELD OF THE INVENTION

The present invention relates to an image reading apparatus for reading image information, particularly to such an image reading apparatus for reading image information that is displayed on display means by applying thereto a voltage and/or an electric field.

BACKGROUND OF THE INVENTION

Recently, it has become possible to generate electronic image data by a small device that is light in weight and portable (e.g. a mobile phone, a portable terminal, and a digital camera) and to send or receive the electronic image data by such a small device. Accordingly, there is a need for a method of outputting image data stored in such a small device onto a print sheet.

An example of a method of outputting image data to an output device is a printer driver, which is widely adopted in a PC (Personal Computer). However, a printer driver is not suitable for use in such a portable small device, because communication control by a printer driver is complex, and because different drivers are used in order to deal with different kinds of devices. Therefore, it is difficult for such a small device to directly print out (output) the image information therein by using an image forming apparatus, such as a printer.

In this regard, it is possible to adopt a method of sending the image data to another device and reading the image data by an electrophotographic process.

A specific example of such a device is an image forming apparatus disclosed in Japanese Publication for Unexamined Patent Application, No. 8868/1990 (Tokukaihei 2-8868; publication date: Jan. 12, 1990). In this image forming apparatus, a device, which has the image data to be printed out, forms the image data in a liquid crystal display device of the image forming apparatus. Then the image data is displayed, and read through a document reading window of the image forming apparatus for the electrophotographic process. In this way, the image data is printed out.

The image forming apparatus disclosed in the publication uses a liquid crystal display device (hereinafter liquid crystal panel) at the display section. In general, a glass substrate is used for a liquid crystal panel. Consequently, when the liquid crystal panel is placed on a document placement table of an image reading apparatus so that image information is read from the liquid crystal panel, for example, the liquid crystal panel touches a platen glass of the document placement table. This is problematic, because the platen glass may be damaged. If the platen glass is damaged, not only the image information displayed on the liquid crystal panel, but also image information recorded on, for example, a sheet of usually used paper, cannot be read normally. There is also a problem that the liquid crystal panel cannot be handled easily because the glass substrate is used for the liquid crystal panel.

SUMMARY OF THE INVENTION

An object of the present invention is to provide an image reading apparatus that can be easily handled, and that is capable of suitably reading image information displayed on a display section.

To attain this object, an image reading apparatus of the present invention includes: a display section for displaying image information by being subjected to a voltage and/or an electric field; a writing section for writing the image information into the display section by applying thereto the voltage and/or the electric field; and a reading section for optically reading the image information displayed on the display section, the display section having flexibility.

The display section is a medium in which image information can be written, erased, and rewritten, in accordance with an electric signal. Specifically, the display section displays image information by being subjected to a voltage and/or an electric field (i.e. in accordance with an electronic signal applied thereto). Examples of the display section are an electronic sheet (electronic paper) an organic EL, and the like.

The writing section is capable of writing, into the display section, image information obtained by various communication means, such as Bluetooth and the like. Specifically, the writing section applies a voltage and/or an electric field to the display section so as to cause the display section to display the image information.

In this arrangement, the display section has flexibility (i.e. the display section is flexible). Therefore, when the display section is placed on a platen glass, which is a document placement table, the platen glass will not be damaged. This makes it possible to suitably read the image information displayed on the display section.

Moreover, the display section in this arrangement can be more easily handled than in a conventional arrangement where the display section is a liquid crystal panel. Specifically, a liquid crystal display device is detachably provided in a conventional arrangement. In this case, the liquid crystal display device cannot be handled easily because, for example, it is necessary in providing and separating the liquid crystal display device to make sure that, for example, the liquid crystal display device do not strongly touch the platen glass. In the present invention, by using the display section having flexibility, it is more unlikely that the platen glass and the like are damaged. Therefore, the display section can be handled more easily.

The display section has flexibility to such an extent as to be capable of displaying image information in a bent state. In other words, the display section has flexibility to such an extent as to be conveyed by an automatic document conveying device, for example.

To attain the object above, an image forming apparatus of the present invention includes the image reading apparatus.

With this arrangement, by including the image reading apparatus, it is possible to print out (output) the image information displayed on the display section (i.e. image information read by the reading section). Moreover, even when image information is displayed on or stored in a portable communication device, in which case data conversion or the like is conventionally required in order to print out the image information suitably, the arrangement above makes it possible to print out the image information more easily and suitably.

To attain the object above, an image reading method of the present invention includes the steps of: applying a voltage and/or an electric field to a display section having flexibility so as to display image information on the display section, conveying the display section to an image reading position, and optically reading the image information displayed on the display section.

In this arrangement, the image information displayed on the display section by applying thereto the voltage and/or the electric field is optically read. The display section has flexibility (i.e. the display section is flexible), thereby ensuring that the platen glass of the document placement table will not be damaged. Therefore, the display section can be easily handled, and the image information can be read easily. Moreover, because the actual image information is displayed before being read, it is possible to easily ascertain a size of the image information to be read, for example.

To attain the object above, an image reading method of the present invention includes the steps of: applying a voltage and/or an electric field to a display section having flexibility so as to display image information on the display section, conveying the display section to an image reading position, and optically reading the image information displayed on the display section, the display section including at least a first and a second display regions, the image information displayed on the first display section being read, and another image information being written into the second display region by applying thereto the voltage and/or the electric field.

In this arrangement, reading and writing are simultaneously performed with respect to the different display regions. This makes it possible to read the image information at a higher speed. Therefore, when plural sets of image information are to be read, a total reading time can be shortened.

For a fuller understanding of the nature and advantages of the invention, reference should be made to the ensuing detailed description taken in conjunction with the accompanying drawings.

DESCRIPTION OF THE EMBODIMENTS

Embodiment 1

Referring to FIGS. 1 to 5, the following describes an embodiment of the present invention.

Figure 1:
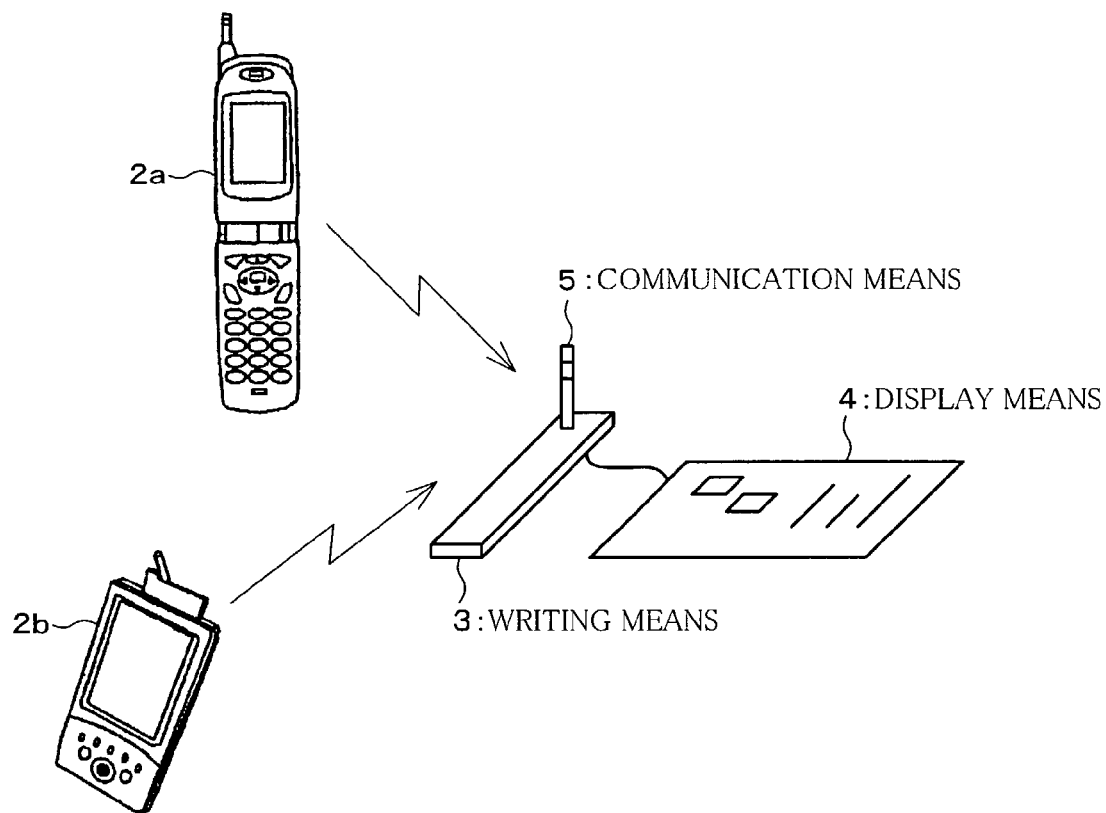
FIG. 1 is a perspective view illustrating a schematic arrangement of an image reading apparatus of the present invention.
Figure 2:
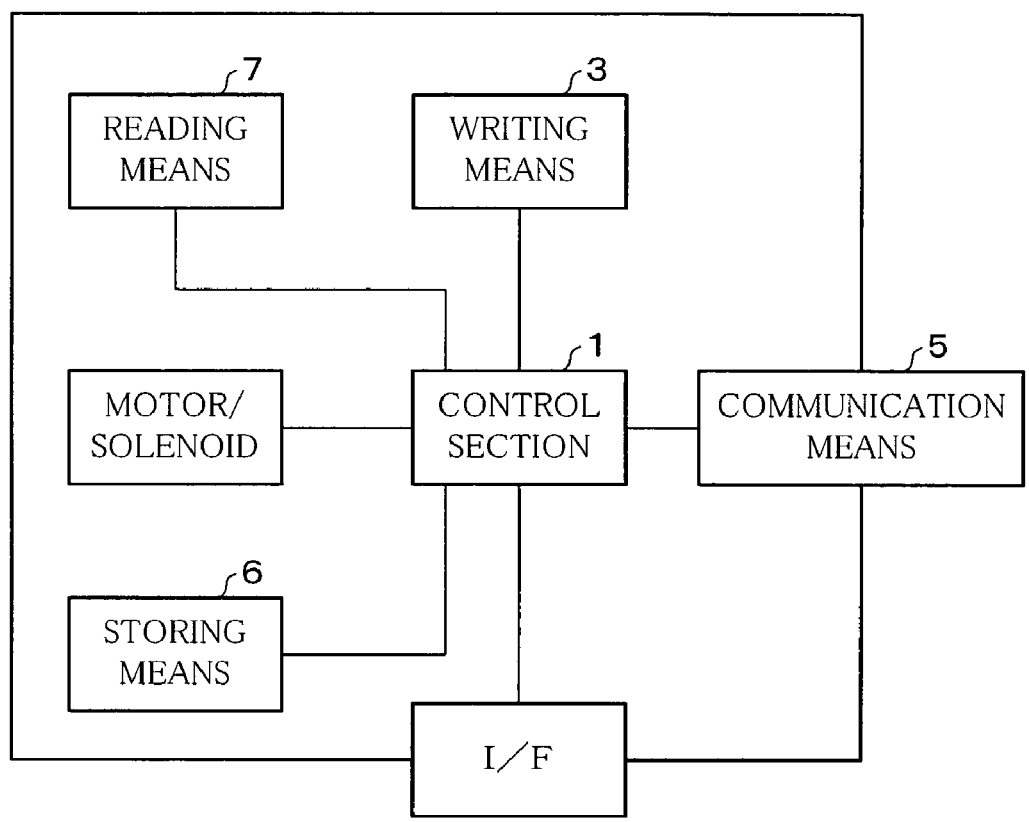
FIG. 2 is a block diagram illustrating an arrangement of a control section.
Figure 3:
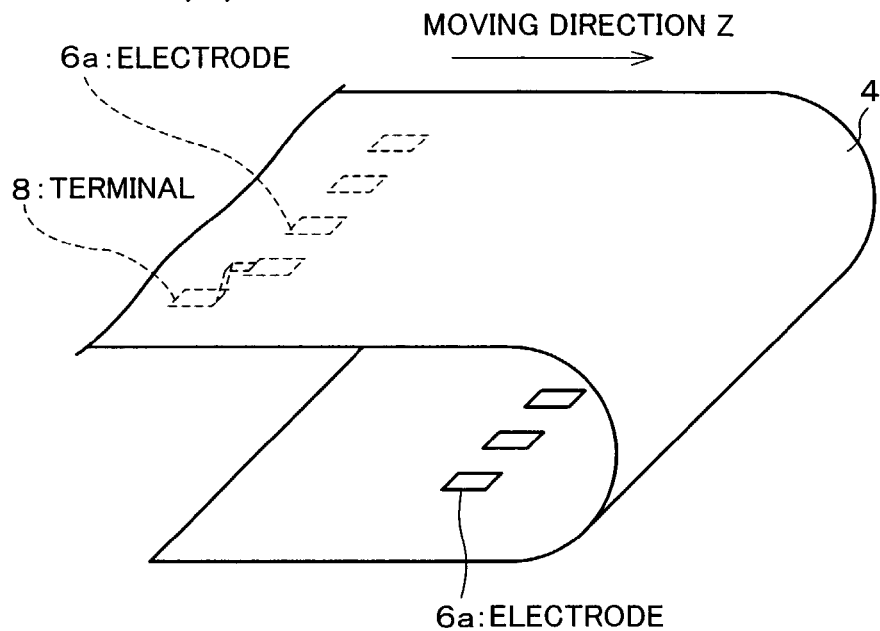
FIG. 3a is a perspective view illustrating an arrangement of an electronic sheet, showing that the electronic sheet is in a bent state.
FIG. 3b is a plan view illustrating the arrangement of the electronic sheet, showing a disposition of electrodes provided on the electronic sheet.
FIG. 3c is a plan view illustrating an arrangement of the electronic sheet, showing another disposition of the electrodes.
Figure 3:
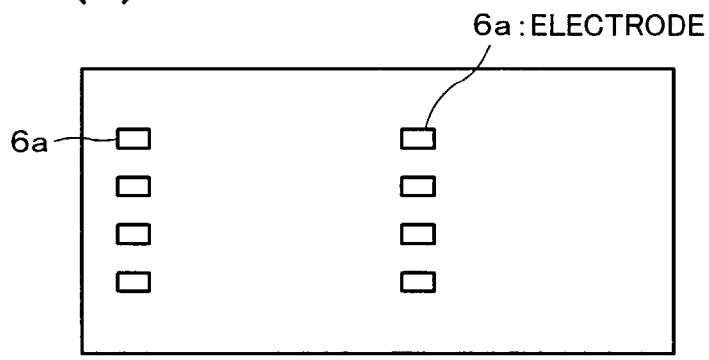
Figure 3:
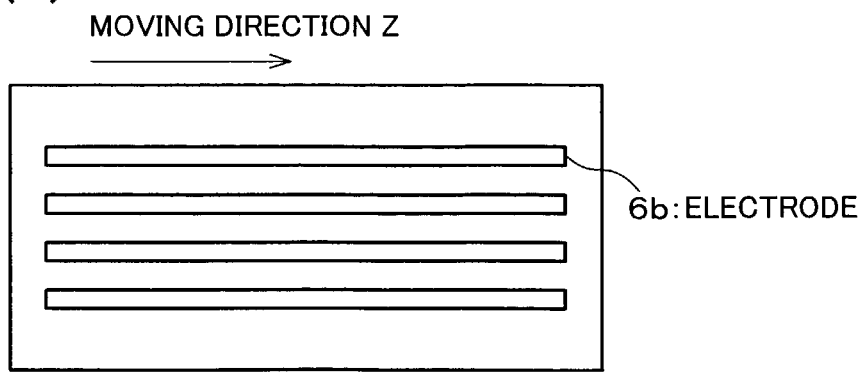

As shown in FIGS. 1 and 2, an image reading apparatus of the present invention includes a writing section (writing means) 3, a display section (display means) 4, and a reading section (reading means) 7. It should be noted that, in the present embodiment, described is an arrangement in which a communication section (communication means) 5 is further provided. With this arrangement, it is possible to read image information stored in a portable communication device 2, such as a mobile phone 2a and a portable terminal 2b. In the present invention, the term "image information" covers literal information, symbolic information, and the like. As such, any image, letter, symbol, or the like displayed on the display section 4 is covered by the term "image information".

The display section 4 displays the image information by application of a voltage and/or an electric field to the display section 4, in such a manner that the image information can be rewritten. The display section 4 has flexibility (i.e. the display section 4 is flexible). Specific examples of the display section 4 are an electronic sheet, an organic EL, and the like. Among the examples of the display section 4, the electronic sheet is preferable in that the electronic sheet is highly flexible. Described below is an example in which the display section 4 is an electronic sheet 4. An arrangement of the electronic sheet 4 is described later.

The writing section 3 applies the voltage and/or the electric field to the electronic sheet 4 in accordance with the image information transmitted from the portable communication device 2 via the Internet, a telephone line, Bluetooth, and the like. A specific example of the writing section 3 is a driver (driving circuit) or the like for causing the display section 4 to display an image. The writing section 3 receives the image information displayed on the portable communication device 2 or the image information stored in the portable communication device 2 via the communication section 5, without conversion. In accordance with the image information, the writing section 3 applies the voltage and/or the electric field to the electronic sheet 4, so as to cause the electronic sheet 4 to display the image information. Note that the term "writing" often refers to an operation of applying the voltage and/or the electric field to the electronic sheet 4 so as to cause the electronic sheet 4 to display the image information. The term "image information" refers to, specifically, one generated by the portable communication device 2 or received by the portable communication device 2 from an external device, for example.

The image information transmitted from the portable communication device 2 is the image information stored in the portable communication device 2. The writing section 3 may cause the electronic sheet 4 to display the received image information without processing, or after processing, such as scaling up.

The electronic sheet 4 displays the image information written by the writing section 3. The image information displayed on the electronic sheet 4 can be rewritten. Accordingly, the electronic sheet 4 is capable of displaying another image information that is rewritten by the writing section 3. The image information displayed on the electronic sheet 4 is read by the reading section 7, and is subsequently stored in a storing section 6, which is described later.

The communication section 5 receives the image information transmitted from the portable communication device 2. Specifically, an example of the communication section 5 is a receiver (receiver circuit) or the like. The communication section 5 may be adapted to transmit the image information to another external device.

The reading section 7 optically reads the image information displayed on the electronic sheet 4. An example of the reading section 4 is a scanner or the like. The reading section 7 is also capable of reading image information recorded on a sheet of paper and the like. The reading section 7 is well-known; therefore, a description thereof is omitted.

As shown in FIG. 2, the image reading apparatus of the present embodiment includes a control section 1. The control section 1 controls the reading section 7, the writing section 3, and the communication section 5. In the present embodiment, the control section 1 controls the storing section 6 and a driving system such as a motor and a solenoid. When the image reading apparatus of the present embodiment is connected to an image forming apparatus or the like, the control section 1 controls an interface (I/F) for exchanging information with the image forming apparatus. An example of the control section 1 is a CPU (Central Processing Unit).

The storing section 6 stores the image information (read information) that has been read by the reading section 7. The storing section 6 may be adapted to store, without conversion, the image information transmitted from the portable communication device 2. Specific examples of the storing device 6 are a hard disk, a memory, and the like. When the image reading apparatus is connected with the image forming apparatus, the image information (that is transmitted from the portable communication device and/or the read information) may be stored in a storing device provided to the image forming apparatus.

The driving system such as a motor and a solenoid is, for example, such a motor and a solenoid that drive a CCD (Charge Coupled Device) of the reading section 7 or a conveying roller of an automatic document conveying device.

The arrangement of the electronic sheet 4 is described below.

The electronic sheet 4 is arranged as follows. Electrically charged particles (such as toner) that are colored in black, white, or the like, are confined inside a space between two sheets of plastic. By external application of a voltage and/or an electric field, the particles are attached to or detached from one of the two sheets of plastic, thereby displaying the image information. The electronic sheet 4 is very thin: 200 µm to 300 µm in thickness, and has flexibility. This makes it possible to use the electronic sheet 4 in many ways.

The electronic sheet 4 is a thin, flexible, and rewritable medium. A characteristic of the electronic sheet 4 is that the electronic sheet 4 keeps displaying the image information even when no electricity is supplied to the electronic sheet 4, until a rewrite signal for next image information or an erase signal is supplied thereto.

Examples of a method for displaying the image information at the electronic sheet 4 are a method in which a voltage is applied to electrodes provided to the electronic sheet 4, and a method in which an electric field is applied to the electronic sheet 4.

The following provides a detailed description of a method for displaying the image information at the electronic sheet 4 in a case where the electronic sheet 4 includes the electrodes for accepting the voltage.

In this case, as shown in FIGS. 3a and 3b, the electronic sheet 4 has a plurality of electrodes 6a, on a reverse surface of a display surface of the electronic sheet 4, that are aligned to be perpendicular to the moving direction Z, in which the electronic sheet 4 is to be conveyed. The image information is written into the electronic sheet 4 by applying the voltage (electric signal) to the electrodes 6a. The electrodes 6a are so disposed as to respectively touch, at predetermined positions, terminals 8 of the writing section 3, when the electronic sheet 4 is located at a predetermined position. When the electronic sheet 4 is located at the predetermined position, therefore, the image information can be rewritten. The terminals 8 applies the voltage (electric signal) to the electronic sheet 4.

In a case where the electronic sheet 4 is conveyed to the reading section 7 by an automatic document conveying device, for example, as shown in FIG. 3c, such an arrangement may be adopted in which the electrodes 6b extend substantially in parallel with the moving direction Z, in which the electronic sheet 4 is to be conveyed. With this arrangement, for example, it is possible to keep the electrodes 6b to be always in contact with the respective terminals 8 of the writing section 3, in an arrangement where the terminals 8 of the writing section 3 are so disposed on a conveying path for the electronic sheet 4 as to respectively touch the electrodes 6b. As a result, it is possible to write the image information into the electronic sheet 4 while the electronic sheet 4 is being conveyed.

On the other hand, in the method for displaying the image information by externally applying the electric field to the electronic sheet 4, an electric field applying section is provided in the conveying path for the electronic sheet 4, for writing of the image information is written into the electronic sheet 4.

According to the methods above, it is possible to display, with a simple arrangement, the image information transmitted from the portable communication device 2 such as a portable terminal, a mobile phone, and the like.

The following describes an example in which the electronic sheet 4 constitutes a cover (hereinafter "document pressing member") of the document placement table. The document pressing member is a part of the reading section 7. In a conventional image reading device, the document pressing member fixes a document (such as a sheet of paper) so that the document is not moved while being read. The term "document" refers to a medium in which the image information is stored. The document pressing member is capable of pressing not only such conventional medium as a sheet of paper, but also the display section 4 (electronic sheet 4) of the present embodiment.

Figure 4:
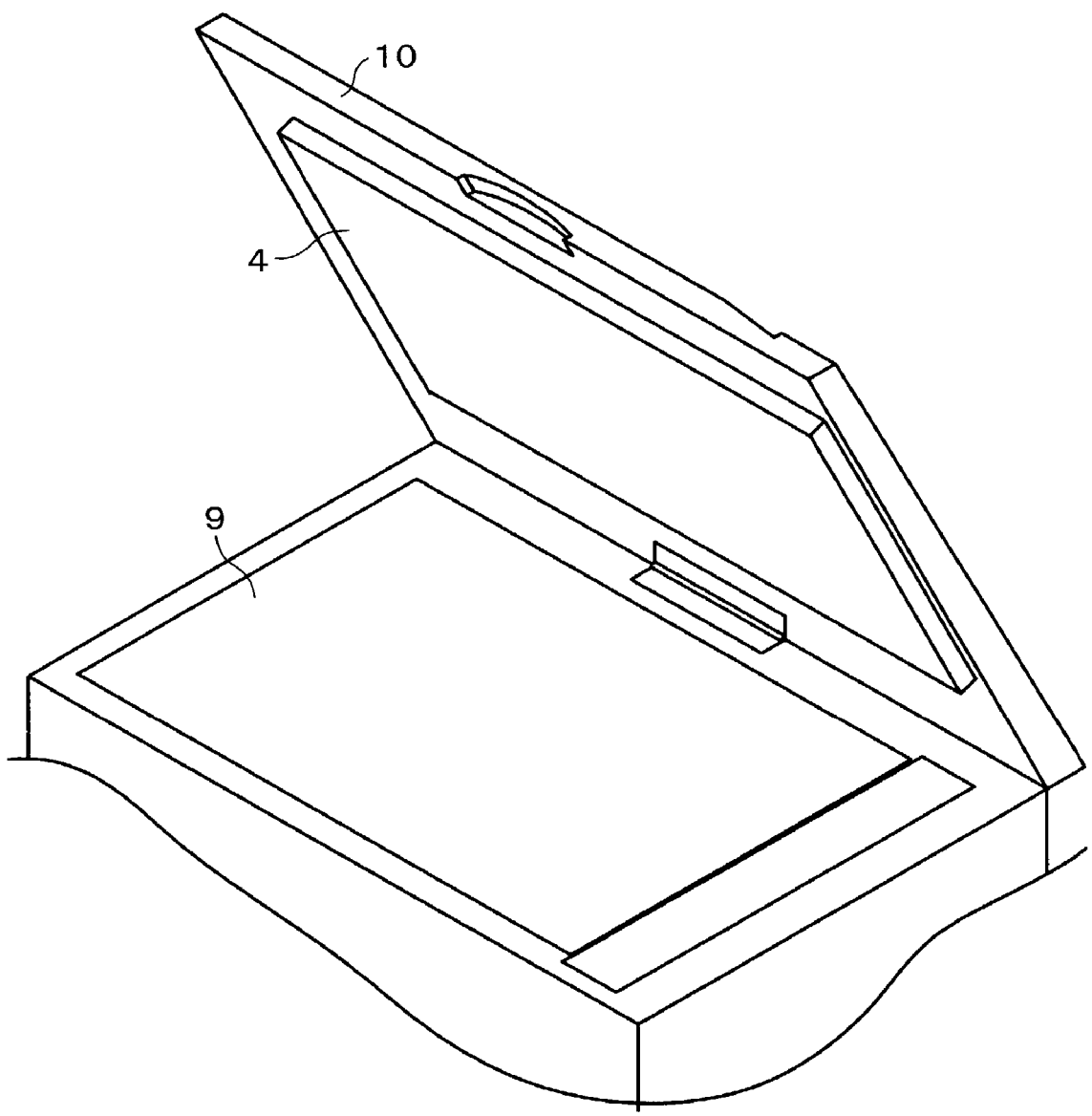
FIG. 4 is a perspective view illustrating an arrangement of a document pressing member.

As shown in FIG. 4, in the image reading apparatus of the present embodiment, the document pressing member 10 includes the electronic sheet 4. Specifically, the electronic sheet 4 replaces a paper pressing mat of a widely used document pressing member 10. The image reading apparatus of the present embodiment also includes the communication section 5 (not shown) for receiving the image information transmitted from the portable communication device 2, and the writing section 3 (not shown) for writing the image information into the electronic sheet 4. The writing section 3 is in contact with the electrodes 8, which are on a reverse surface of a display surface of the electronic sheet 4, so as to apply the voltage and/or the electric field to the electronic sheet 4. The electronic sheet 4 faces a platen glass 9 when the document pressing member 10 is closed. When the document pressing member is closed, the electronic sheet 4 presses the platen glass 9.

Figure 5:
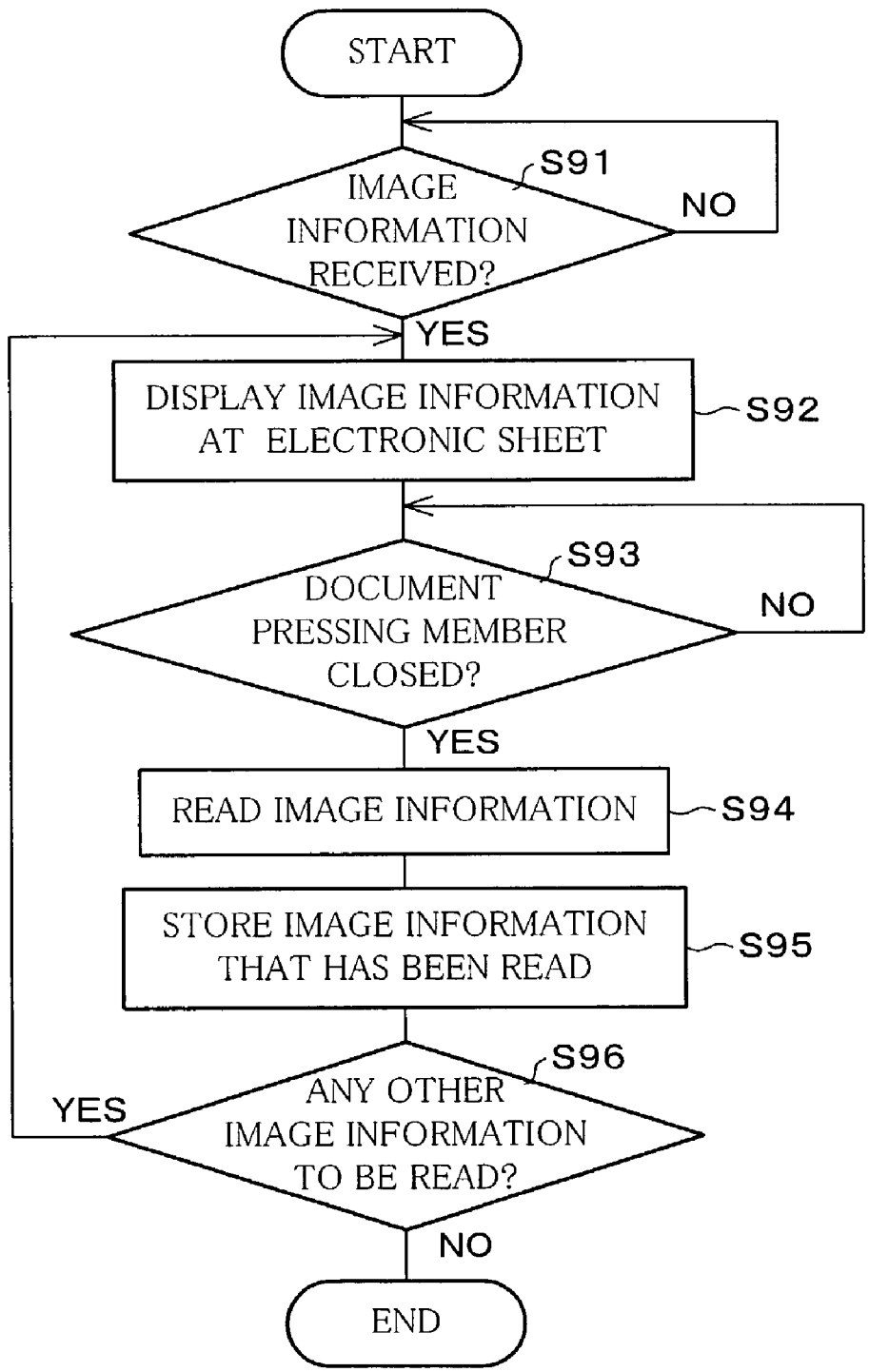
FIG. 5 is a flowchart explaining an image reading method of the present invention.

With reference to the flowchart in FIG. 5, the following describes a flow of a process for reading the image information transmitted from the portable communication device 2 in the image reading apparatus of the above arrangement.

First, the control section 1 judges whether or not the communication section 5 has received the image information transmitted from the portable communication device 2 (S91). Here, the portable communication device 2 transmits, without conversion, the image information stored therein. If it is judged in S91 that the communication section 5 has received the image information, the control section 1 operates the writing section 3 so as to display, on the electronic sheet 4, the image information transmitted from the portable communication device 2 (S92).

Next, the control section 1 judges whether or not the document pressing member 10 is closed (S93). Specifically, the control section 1 judges whether or not the electronic sheet 4, which is provided to the document pressing member 10, faces the platen glass 9, which is provided to the document placement table. The document pressing member 10 is usually used for pressing the document, and is capable of being opened and closed freely. While the document pressing member 10 is raised (opened), the image information displayed on the electronic sheet 4 cannot be read.

The control section 1 then operates an optical system of the reading section 7 so as to read the image information displayed on the electronic sheet 4 (S94). In thus reading the image information, the image information may be scaled up or scaled down, for example, in accordance with instructions of an operator.

Subsequently, the control section 1 causes the storing section 6 to store the image information (read information) (S95), and judges whether or not there is any other information that should be read (S96). When it is judged in S96 that there is any other information that should be read, the process is forwarded to S92. If there is no other information that should be read, the process is terminated.

As described, the image reading apparatus of the present embodiment receives the image information transmitted from the portable communication device 2 via the communication section 5, displays the received image information at the electronic sheet 4 by using the writing section 3, and reads the image information displayed on the electronic sheet 4 by using the reading section 7.

The image information transmitted from the portable communication device 2 is, for example, the image information displayed on or stored in the portable communication device 2. This is because the arrangement of the portable communication device 2 is such (i.e. the portable communication device 2 is very small (portable)) that it is generally difficult to convert the image information into another format, for example. However, by converting (scaling up or scaling down, for example), in the image reading apparatus, the image information transmitted in an unconverted state from the portable communication device 2, it is possible to easily process the image information.

In S92, the control section 1 displays, at the electronic sheet 4, the image information transmitted in the unconverted state from the portable communication device 2. However, in accordance with operator's instructions, the control section 1 may, for example, scale up or scale down the image information, and display the image information.

In the example described above, there is provided the document pressing member 10. However, the present embodiment is not limited to this arrangement. For example, such an arrangement may be adopted in which the electronic sheet 4 is used for the document pressing member 10 provided to the automatic document conveying device or the like. The automatic document conveying device is described later.

As described above, the image reading apparatus of the present embodiment has such an arrangement as to include the electronic sheet 4 for displaying the image information by application of the voltage and/or the electric field to the electronic sheet 4, the writing section 3 for writing the image information into the electronic sheet 4, and the reading section 7 for optically reading the image information displayed on the electronic sheet 4, the electronic sheet 4 having flexibility.

Thus, the flexibility of the electronic sheet 4 ensures that the electronic sheet 4 does not damage the platen glass 9 of the document placement table when the electronic sheet 4 is placed on the platen glass 9, or when the electronic sheet 4 presses the platen glass 9, for example. Moreover, with this arrangement, the image reading apparatus can be more easily handled than with the arrangement in which the electronic sheet 4 is a liquid crystal panel.

Furthermore, by using the electronic sheet 4 as the document pressing member 10, the electronic sheet 4 does not hinder reading of a widely used document (such as a sheet of paper) is to be read. Therefore, for example, it is possible to appropriately read the image information both in the case where the image information to be read is transmitted from the portable communication device 2, and in the case where the image information to be read is recorded on a widely used document (such as a sheet of paper). It should be noted that, by using the electronic sheet 4 as the document pressing member 10, the following effects are also attained.

Specifically, in a case where an image is to be read from a widely used document (such as a sheet of paper), for example, it is possible to change a color of surrounding of the image of the sheet of paper, by using the electronic sheet 4 as the document pressing member 10. In general, white is often the color of a sheet of paper storing an image, and also the color surrounding the image (specifically, the color of a surface of the document pressing member 10 pressing the sheet of paper). However, when an end of the image of the sheet of paper is black, for example, it is more preferable that the surface of the document pressing member 10 pressing the sheet of paper is black. In the present embodiment, because the electronic sheet 4 is used as the document pressing member 10, it is possible to freely change, in accordance with the color of the image of the sheet of paper, the color of the surface of the document pressing member 10 pressing the sheet of paper. Specifically, in a copying machine (image forming apparatus), a sheet of paper that has been read should basically be exactly reproduced (copied), without being processed. Because a basic color of a sheet of paper that is to be read tends to be white, the pressing surface of the document pressing member 10 should be white, so that a copy of the sheet of paper does not look strange. In a scanner, on the other hand, a purpose of reading an image of a sheet of paper is to edit the resultant image data. In this case, because a basic color of the sheet of paper to be read tends to be white, by adopting black as the color of the pressing surface of the document pressing member 10, it is possible for an operator to clearly distinguish a region of the image of the sheet of paper from a region surrounding the image of the sheet of paper. In this manner, it is possible to read an image of a conventional sheet of paper more appropriately.

Moreover, although described above is a case where the display section 4 is the electronic sheet 4, the present embodiment is not particularly limited to this arrangement. For example, an organic EL may be used as the reading section 4.

In the image reading apparatus of the present embodiment, it is more preferable that the thickness of the electronic sheet 4 falls within a range of 200 μm to 300 μm. With this arrangement, it is possible to provide flexible display device.

Embodiment 2

The following describes another embodiment of the present invention with reference to FIG. 3 and FIGS. 6 to 10. For the purpose of easy explanation, members having the same functions as those of members shown in the First Embodiment are labeled with the same referential numerals; therefore, descriptions thereof are omitted.

An image reading apparatus of the present embodiment including a flexible display section 4 for displaying image information by application of a voltage and/or an electric field (electric signal) to the display section 4, a writing section 3 for writing the image information into the display section 4, a reading section 7 for optically reading the image information displayed on the display section 4 has such an arrangement as to further include a conveying section (automatic document conveying device; conveying means) for conveying a sheet of paper to a reading position.

Described below is an arrangement in which image information displayed on an electronic sheet (display means) 4 is read by using the automatic document conveying device. There are roughly two kinds of automatic document conveying devices. Specifically, there are a document fixed type automatic document conveying device (hereinafter "ADF (Automatic Document Feeder)"), and a document moving type automatic document conveying device (hereinafter "SPF (Single Pass Feeder)"). The ADF conveys a sheet of paper (here, the electronic sheet 4) that is to be read to a reading position, and then reads image information while keeping the sheet of document in a stationary state. In other words, the ADF reads an image of the sheet of paper by moving an optical system of a scanner, while keeping a fixed state (a state of a sheet of paper that is not moving) of a sheet of paper that is to be read. On the other hand, the SPF reads image information while conveying a sheet of paper (here, the electronic sheet 4) that is to be read. In other words, the SPF read an image of a sheet of paper by moving the sheet of paper that is to be read, while keeping the optical system of the scanner in a fixed state.

In the present embodiment, described is an arrangement of the image reading apparatus including the SPF in which the image information displayed on the electronic sheet 4 is read.

Figure 6:
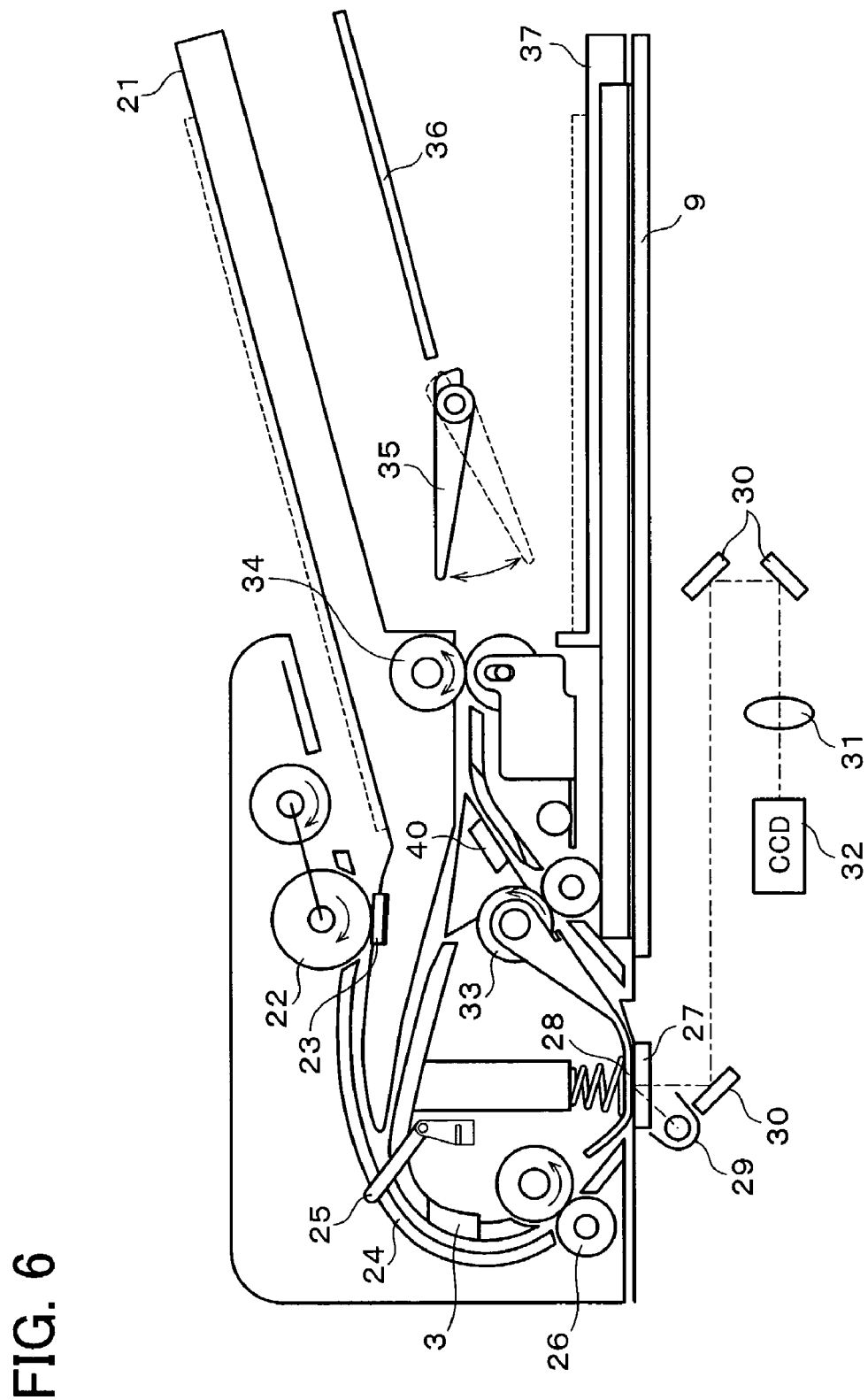
FIG. 6 is a side view illustrating an arrangement of an image reading apparatus including a single pass feeder (SPF).
Figure 7:
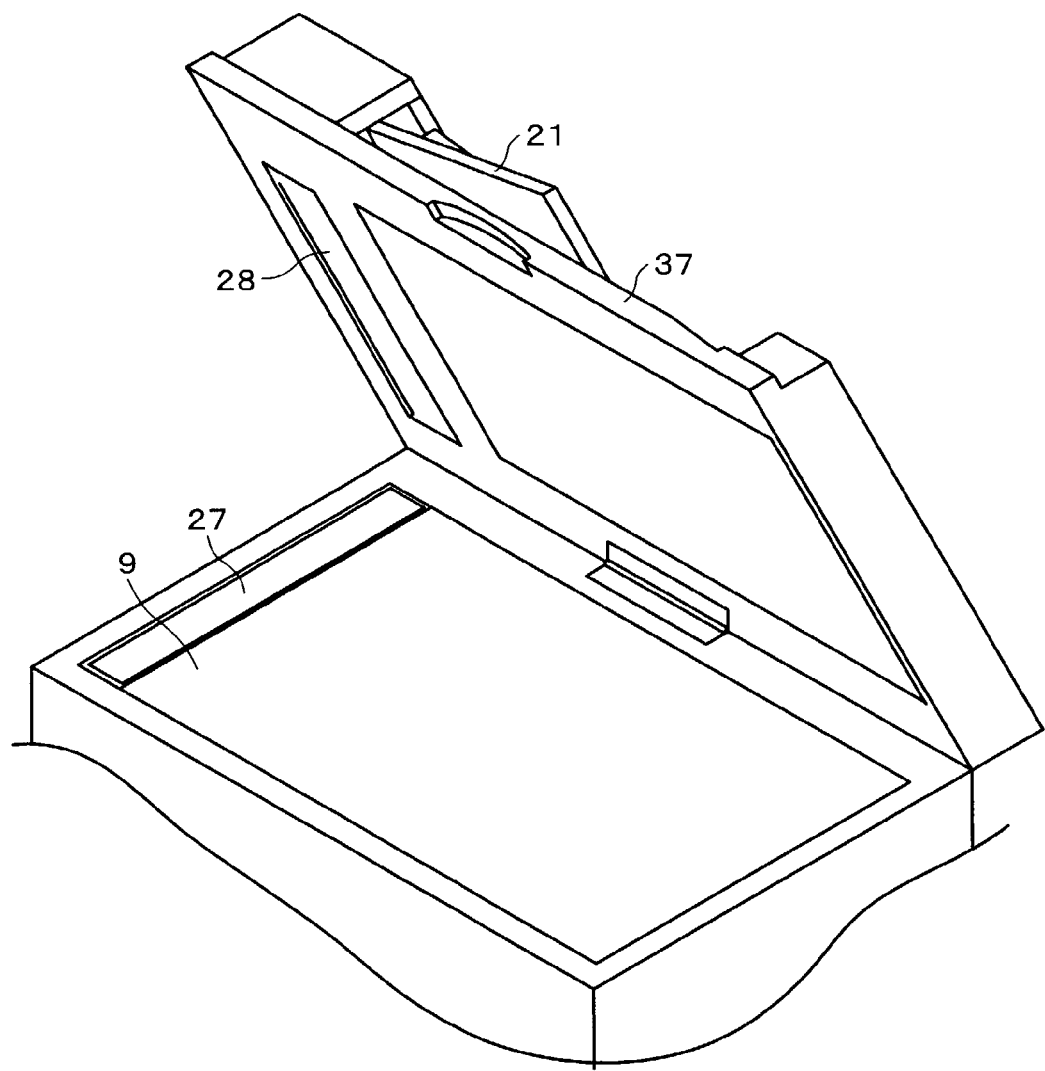
FIG. 7 is a perspective view illustrating the arrangement of the image reading apparatus in FIG. 6.

As shown in FIGS. 6 and 7, the image reading apparatus including the SPF includes a document tray 21, a pickup roller 22, a separation board 23, a conveying guide 24, a document supply sensor 25, a first conveying roller 26, an SPF-use platen glass 27, a document pressing board 28, a light source 29, a mirror 30, a through lens 31, a CCD 32, a second conveying roller 33, document ejection rollers 34, an intermediate tray oscillating board 35, an intermediate tray 36, and a document delivery-out tray 37. The reading section 7 includes the platen glass for SPF 27, the document pressing board 28, the light source 29, the mirror 30, the through lens 31, and the CCD 32. A document ejection section includes the intermediate tray oscillating board 35, the intermediate tray 36, and the document delivery-out tray 37. This arrangement is well-known; therefore, a description thereof is omitted.

In the image reading apparatus of the present embodiment, the writing section 3 is provided at the conveying guide 24. The electronic sheet 4 is to be placed on the document tray 21.

Here, described below is an operation in which the image information is displayed on a plurality of electronic sheets 4 placed on the document tray 21 so as to read the displayed image information.

The plurality of electronic sheets 4 placed on the document tray 21 are conveyed, sheet by sheet, to the conveying guide 24 by a paper supply section, which includes the pickup roller 22 and the separation board 23. After the document supply sensor 25 confirms that the electronic sheet 4 has been supplied, the writing section 3 writes the image information into the electronic sheet 4. Then, the electronic sheet 4 temporarily stops at the first conveying roller 26 so as to adjust, by adjusting a front end of the electronic sheet 4, a timing at which the image information is to be read. The electronic sheet 4 is then conveyed at the adjusted timing and read by the reading section 7. Specifically, a light is radiated onto the electronic sheet 4 by the light source 29 when the electronic sheet 4 passes between the SPF-use platen glass 27 and the document pressing board 28, and the image information displayed on the electronic sheet 4 is read by the CCD 32 by using the mirror 30 and the through lens 31. Subsequently, the image information that has been read (read image) is directly stored in the storing section 6, or is stored after processed by the control section 1 (not shown). The electronic sheet 4 finished with image information reading is conveyed by the second conveying roller 33 and the document ejection rollers 34 of the document ejection section, which is capable of rotating forwardly and backwardly. The electronic sheet 4 is then conveyed to the intermediate tray 36 or the document delivery-out tray 37, depending on which position (a first home position or a second home position) the intermediate tray oscillating board 35 is located at.

Here, the conveying path for the electronic sheet 4 of the present embodiment is described in detail. In descriptions below, a portion of the conveying path from the first conveying roller 26 to the second conveying roller 33 is referred to as a "main conveying path" (here, the first conveying roller 26 and the second conveying roller 33), and a whole portion from the document tray 21 to the intermediate tray 36 or the document delivery-out tray 37 is referred to as the "conveying path". With respect to the moving direction of the electronic sheet 4 (the direction in which the electronic sheet 4 is to be conveyed), the first conveying roller 26 is located upstream to the reading section 7, and the second conveying roller 33 is located downstream to the reading section 7.

Figure 8:
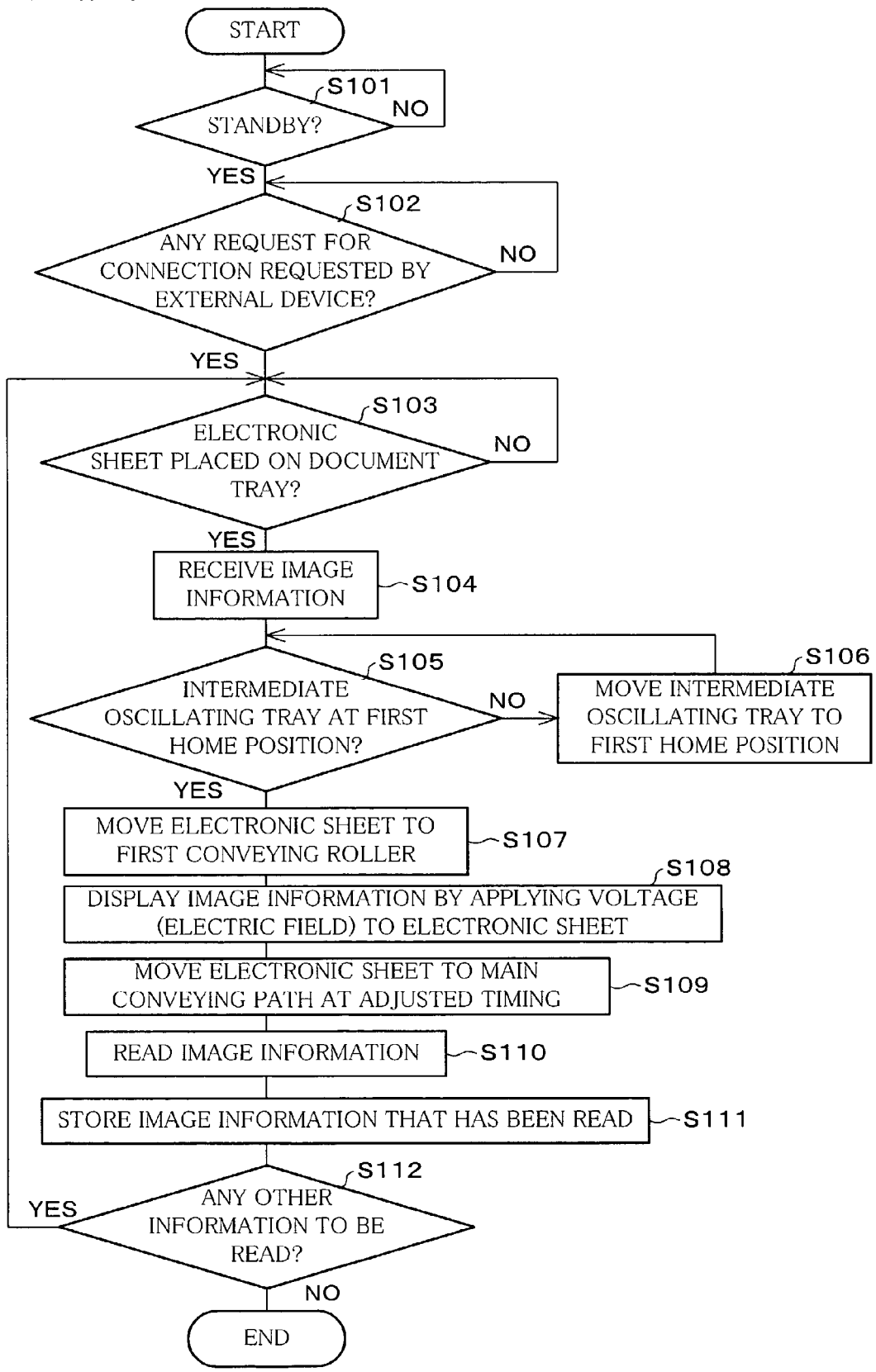
FIG. 8 is a flowchart explaining a method for reading image information by the image reading apparatus in FIG. 6.

Next, with reference to FIG. 8, a plural sheets successive reading process is described, in which the image information transmitted from the portable communication device 2 is successively read by using plural electronic sheets 4 in the image reading apparatus of the arrangement above.

When the plural sheets successive reading process is selected in order to successively read the image information displayed on the electronic sheets 4, the control section 1 first judges whether or not the image reading apparatus is on standby (S101). If the image reading apparatus is on standby, the control section 1 judges whether or not there is a request for connection requested by the portable communication device (external device) 2 (S102). If there is a request for connection requested by the portable communication device, the control section 1 judges whether or not the electronic sheets 4 are placed on the document tray 21 (S103). If it is judged in S103 that the electronic sheets 4 are not placed on the document tray 21, the control section 1 informs the operator that the electronic sheets 4 are not placed on the document tray 21 by beeping out a warning, for example. If it is judged in S103 that the electronic sheets 4 are placed on the document tray 21, the control section 1 operates the communication section 5 so as to receive the image information transmitted from the portable communication device 2 (S104).

Thereafter, the control section 1 judges whether or not the electronic sheets 4 to be conveyed will, finally, be led to the paper delivery-out tray 37 (S105). Specifically, the control section 1 judges whether or not the intermediate tray oscillating board 35 is at the first home position. The first home position referred to here is a position for leading, to the delivery-out tray 37, the electronic sheets 4 finished with the image information reading. If it is judged in S105 that the intermediate tray oscillating board 35 is not at the first home position, the control section 1 moves the intermediate tray oscillating board 35 to the first home position (S106). After the position of the intermediate tray oscillating board 35 has been thus decided, the control section 1 operates the pickup roller 22, so as to convey the electronic sheets 4 to the first conveying roller 26 (S107).

Then, the control section 1 operates the writing section 3, so as to apply, in accordance with the image information transmitted from the portable communication device 2, a voltage and/or an electric field to the electronic sheets 4 that have been conveyed to the first conveying roller 26, thereby displaying the image information (S108). The electronic sheets 4 are temporarily stopped at the first conveying roller 26, and are conveyed to the main conveying path in accordance with reading timings (S109). After that, the control section 1 operates the reading section 7, so as to read the image information displayed on the electronic sheets 4 (S110). Then, the electronic sheets 4 finished with the image information reading are conveyed to the delivery-out tray 37 by the second conveying roller 33 and the document ejection rollers 34.

Next, the control section 1 causes the storing section 6 to store the image information that have been read (read information) (S111). The control section 1 then judges whether or not there is further image information that should be read (S112). If it is judged in S112 that there is further image information to be displayed on the electronic sheets 4, the process goes back to S103. If it is judged in S112 that there is no image information to be read, the process is terminated.

In this manner, the image information displayed on the electronic sheet 4 is read.

According to the description above, in S108, the control section 1 causes the electronic sheets 4 to display the image information by temporarily stopping the electronic sheets 4 that have been conveyed to the first conveying roller 26, and applying the voltage and/or the electric field to the electronic sheets 4. However, the image information can be displayed in other ways. For example, as shown in FIG. 3(c), in a case where the electrodes provided on the reverse side of the display side of the electronic sheet 4 are disposed substantially in parallel with the moving direction of the electronic sheet 4 (the direction in which the electronic sheet 4 is to be conveyed), the voltage and/or the electric field may be applied in S107 while the electronic sheets 4 are being conveyed to the first conveying roller 27.

Further, the storing section 6 may temporarily store, without conversion, the image information transmitted from the portable communication device 2. In this case, if it is judged in S112 that there is further image information to be displayed on the electronic sheets 4, the control section 1 judges whether or not another electronic sheet 4 is placed on the document tray 21 (S103). If it is judged that another electronic sheet 4 is placed, the control section 1 conveys, to the conveying path, the another electronic sheet 4 placed on the document tray 21. After that, the process goes on to S108. If it is judged that there is no new electronic sheet 4 placed on the document tray 21, the control section 1 prompts the operator to place a new electronic sheet 4. By repeating this process, the image information is read successively.

In the description above, the writing section 3 is provided on the conveying path between the pickup roller 22 and the first conveying roller 26. However, where to locate the writing section 3 is not particularly limited; the writing section 3 may be disposed anywhere so long as it is on the conveying path to the reading section 7 in the direction in which the electronic sheet 4 is to be conveyed. For example, in a case where the electronic sheet 4 that is in contact with the document tray 21 is conveyed first among the plural electronic sheets 4 placed on the document tray 21, the writing section 3 may be provided on the document tray 21.

Moreover, the image reading apparatus of the present embodiment may include an erasing section 40. The erasing section 40 erases, by applying a voltage (electric field), the image information displayed on the electronic sheet 4, and is used when it is desired that the image information displayed on the electric sheet 4 be erased in order to preserve confidentiality, for example. The erasing section 40 is suitable for successively reading the image information by using a single electric sheet 4, as described later. Although an arrangement in which the SPF includes the erasing section 40 is described in the present embodiment, the erasing section 40 may be provided in the First Embodiment, for example. In this case, the erasing section 40 may be provided to the document pressing member 10.

Figure 9:
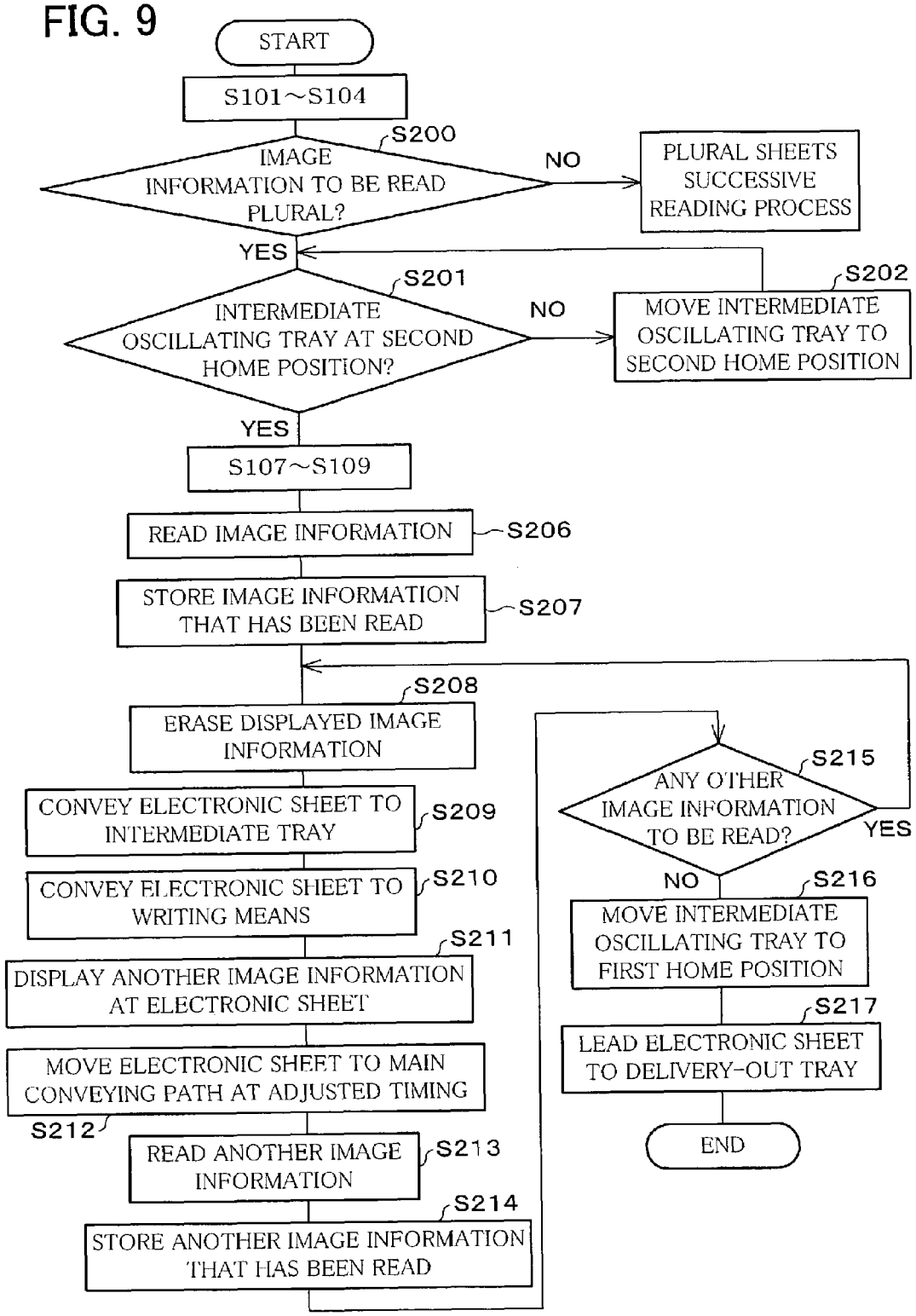
FIG. 9 is a flowchart explaining a method for successively read image information by using the image reading apparatus in FIG. 6 and a single electronic sheet.

With reference to the flowchart in FIG. 9, the following describes a single-sheet successive reading process, in which plural sets of image information can be successively read even if only a single electronic sheet 4 is used. In this case, as shown in FIG. 6, the erasing section 40 is provided between the second conveying roller 33 and the document ejection rollers 34 of the SPF. Also, in this case, the writing section 3 is disposed on the conveying path where the conveying path from the pickup roller 22 to the first conveying roller 26 and the conveying path from the first conveying roller 26 to the document ejection rollers 34 overlap (that is, on the conveying path from the first conveying roller 26 to the document supply sensor 25 or at a surrounding area (area in a vicinity) of that part of the conveying path. In the description below, steps that are identical to those in the plural sheets successive reading process are labeled with the same referential numerals; therefore, descriptions thereof are omitted.

When the operator selects the single sheet successive reading process, in which image information is successively read by using a single electronic sheet 4, steps of S101 to S104 are performed first. Then, the control section 1 judges whether or not there are plural sets of image information to be read (S200). If the control section 1 judges that there are not plural sets of image information to be read (in other words, that image information reading is to be performed only once), the plural sheets successive reading process is automatically performed. If the control section 1 judges that there are plural sets of image information to be read, on the other hand, the process goes on to S201.

Next, the control section 1 judges whether or not the intermediate tray oscillating board 35 is at the second home position (S201). The second home position referred to here is a position for leading, to the intermediate tray 36, the electronic sheet 4 finished with the image information reading. If it is judged in S201 that the intermediate tray oscillating board 35 is not at the second home position, the control section 1 moves the intermediate tray oscillating board 35 to the second home position (S202). Then, by performing processes of S107 to S109, the electronic sheet 4 is conveyed to the reading position.

After that, the control section 1 operates the reading section 7 so as to read the image information displayed on the electronic sheet 4 (S206), and operates the storing section 6 so as to store the image information that has been read (read information) (S207).

Subsequently, the control section 1 conveys the electronic sheet 4 by the second conveying roller 33 to the document ejection rollers 34, which is capable of rotating forwardly and backwardly. At this time, the image information displayed on the electronic sheet 4 is erased by the erasing section 40 provided on the conveying path between the second conveying roller 23 and the document ejection rollers 34 or at the surrounding area (in the vicinity) of that part of the conveying path (S208). Then, the electronic sheet 4 is led to the intermediate tray 36 by rotation of the document ejection rollers 34 and in accordance with a position of the intermediate tray oscillating board 35 (S209). Accordingly, at this time, the document ejection rollers 34 are rotating in such a direction as to lead the electronic sheet 4 to the intermediate tray 36. The electronic sheet 4 that has been led to the intermediate tray 36 temporarily stops with a back end thereof pinched by the document ejection rollers 34. Then, the control section 1 causes the document ejection rollers 34 to roll inversely, thereby conveying the electronic sheet 4 to the writing section 3 via a sub conveying route (S210). Specifically, the electronic sheet 4 is conveyed to the first conveying roller 26. The "sub conveying route" referred to here is the conveying path from the document ejection rollers 34 to the first conveying roller 26. Therefore, the main conveying path and the sub conveying path are different.

Afterwards, the control section 1 writes new image information into the electronic sheet 4 by applying a voltage and/or an electric field to the electronic sheet 4 that has been conveyed via the sub conveying route (S211). In this manner, the control section 1 causes the electronic sheet 4 to display new image information.

Then, the electronic sheet 4 that has temporarily stopped at the first conveying roller 26 is conveyed to the main conveying path in accordance with a reading timing (S212). Subsequently, the control section 1 operates the reading section 7 so as to read the new image information displayed on the electronic sheet 4 (S213). The control section then operates the storing section 6 so as to store the new image information that has been read (read information) (S214). After that, the control section 1 judges whether or not there is further image information to be read (S215).

If it is judged in S215 that there is further image information to be read, it is possible to successively read plural sets of image information by repeating the steps from S208 to S214. On the other hand, if it is judged that there is no further image information to be read, the control section 1 moves the intermediate tray oscillating board 35 to the first home position (S216). Then, the control section 1 operates the second conveying roller 33 and the document ejection rollers 34 so as to lead the electronic sheet 4 to the document delivery-out tray 37, and terminates the process.

As described above, it is possible to successively read plural sets of image information even if only one electronic sheet is used.

In the description above, the erasing section 40 is provided between the second conveying roller 33 and the document ejection rollers 34, as an example. However, the erasing section 40 may be disposed differently. For example, the erasing section 40 may be provided on the sub conveying path or a surrounding area (in a vicinity) thereof.

As described above, the image reading apparatus of the present embodiment including the flexible display section 4 for displaying the image information by application of an electric signal, to the display section 4, a writing section 3 for writing the image information into the display section 4, and the reading section 7 for optically reading the image information displayed on the display section 4 has such an arrangement as to include the conveying section for conveying the display section 4 to the reading position at which the reading section 7 reads the image information.

With the arrangement above, it is possible to successively read plural sets of image information.

Moreover, by disposing the writing section 3 and the reading section 7 at different positions, the writing section 3 writing the image information transmitted from the portable communication device 2, one set of image information can be written while the other set of image information are being read. As a result, it is possible to read plural sets of image information at a higher speed.

Further, for example, by using a conventional automatic document conveying device as the conveying section, it is possible to carry out the present invention by merely improving the automatic document conveying device, without changing the arrangement of the reading section 7 and the like.

Figure 10:
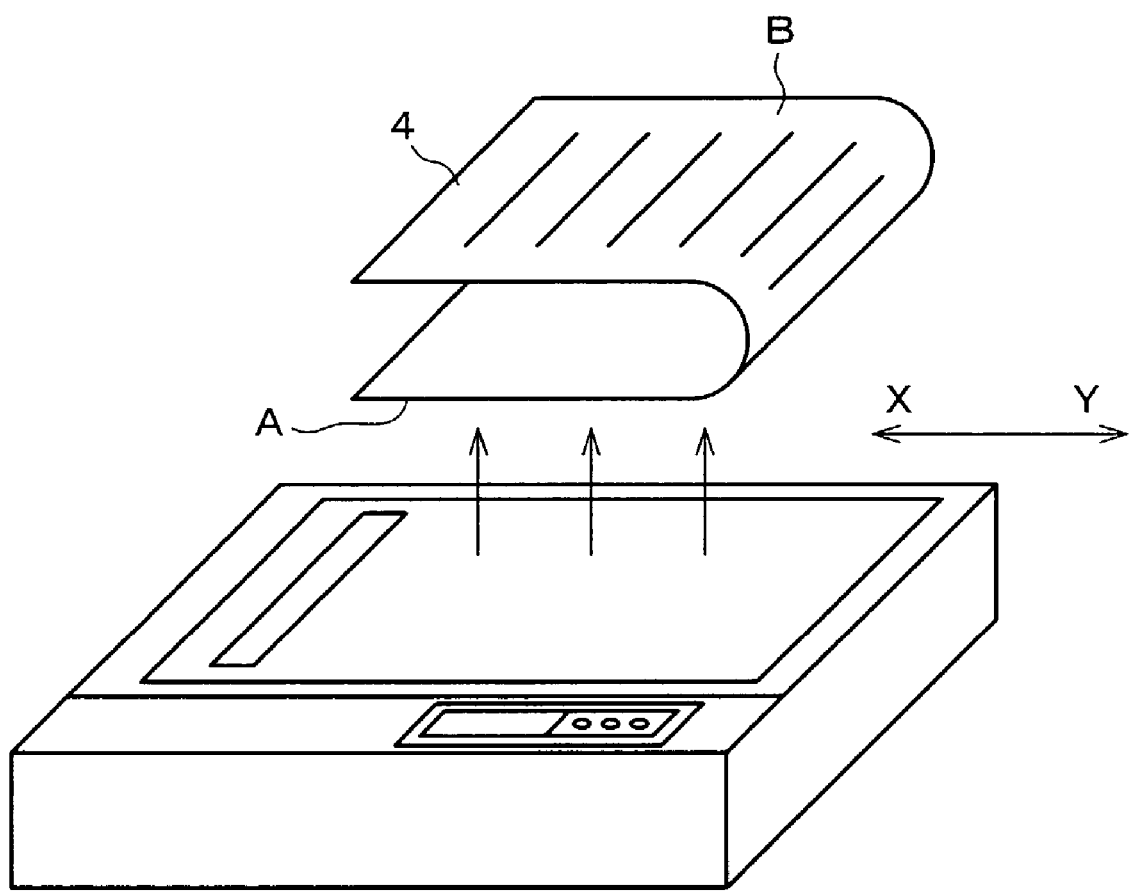
FIG. 10 is a perspective view illustrating an arrangement with which the electronic sheet including a plurality of display regions is read.

When the electronic sheet 4 has more than one region that can be read at once, the image information may be successively read in the following manner. As shown in FIG. 10, the electronic sheet 4 has at least two display regions A and B. While image information is displayed on the display region A and is being read, image information that is to be read next is written into the display region B. When the reading of the image information displayed on the display region A is finished and the writing, into the display region B, of the image information to be read next is finished, the electronic sheet 4 is conveyed so that the reading position B is moved to the reading position. Then, while the image information displayed on the display region B is being read, the image information displayed on the display region A is erased. Thereafter, yet another image information is written into the display region A. When the reading of the image information displayed on the display region B is finished and writing, into the display region A, of the yet another image information is finished, the electronic sheet 4 is conveyed in an opposite direction so as to move the display region A to the reading position.

In this way, when the electronic sheet 4 having two display regions is used, it is possible to successively read image information by moving the electronic sheet 4 back and forth so as read image information of one region while writing another image information into the other display region. Here, to move the electronic sheet 4 back and forth is to convey the electronic sheet 4 in a reading direction in which the image information is to be read and in a direction opposite thereto. The number of the display regions is not limited to two. For example, if there are three display regions, such an arrangement may be adopted in which image information displayed on the first reading region is written, image information that has been read is erased at the second display region, and next image information is written into the third display region.

Moreover, image information may be written and read repeatedly by using two electronic sheets 4 alternately.

In this case, the first electronic sheet 4 is moved to a writing position at which image information is to be written, and the received image information is written into the first electronic sheet 4 by the writing section 3. Then, the first electronic sheet 4 is moved to the reading position so as to read the image information by the reading section 7, while the second electronic sheet 4 is moved to the writing position, and next image information is written into the second electronic sheet 4. Next, the first electronic sheet 4 is moved to a position of the second electronic sheet 4, and the second electronic sheet 4, into which the next image information has been written, is moved to the reading position so that the next image information is read. Meanwhile, the first electronic sheet 4, which is displaying the image information that has been read, is at the writing position. Therefore, next image information can be written into the first electronic sheet 4.

The electronic sheet 4 may be detachable. Specifically, for example, such an arrangement may be adopted in which the electronic sheet 4 that is not displaying image information to be read by the reading section 7 is placed on the conveying section (automatic document conveying device), and is subjected to application of a voltage and/or an electric field while the electronic sheet 4 is conveyed, or before the reading section 7 reads the image information, so that the image information is displayed and read.

Accordingly, in the image reading apparatus of the present invention, the display device for displaying image information by application of a voltage and/or an electric field thereto may further include the writing section 3 for writing the image information by applying the voltage and/or the electric field to the display device, and the reading section 7 for optically reading the image information displayed on the display device.

In this case, it is more preferable that the conveying section is provided for conveying the display device to the reading position at which the reading means reads the image information.

In a case where the conveying section is provided, it is more preferable that the display device is an electronic sheet.

Embodiment 3

Figure 11:
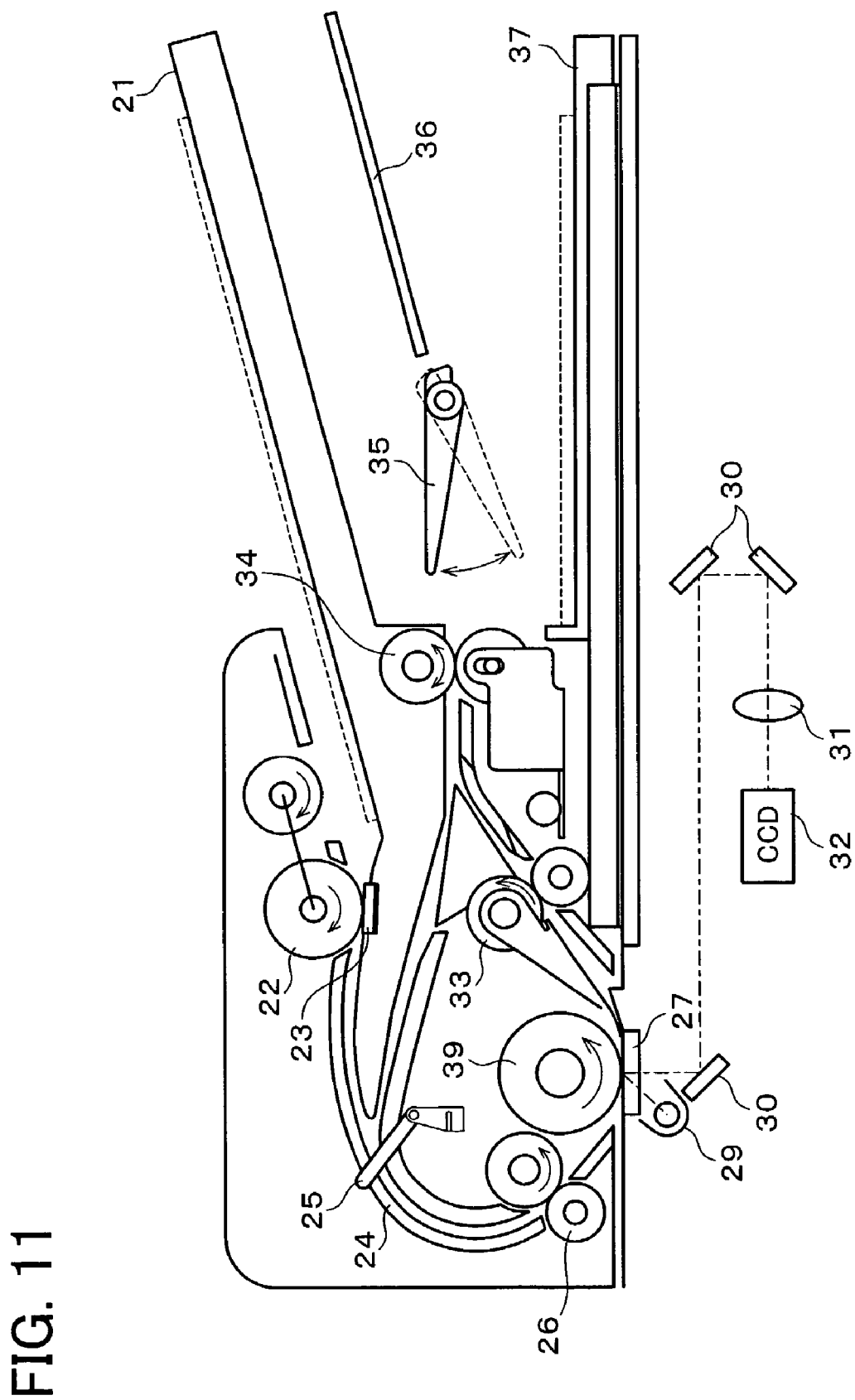
FIG. 11 is a perspective view illustrating an arrangement of an SPF including a conveying belt.
Figure 15:
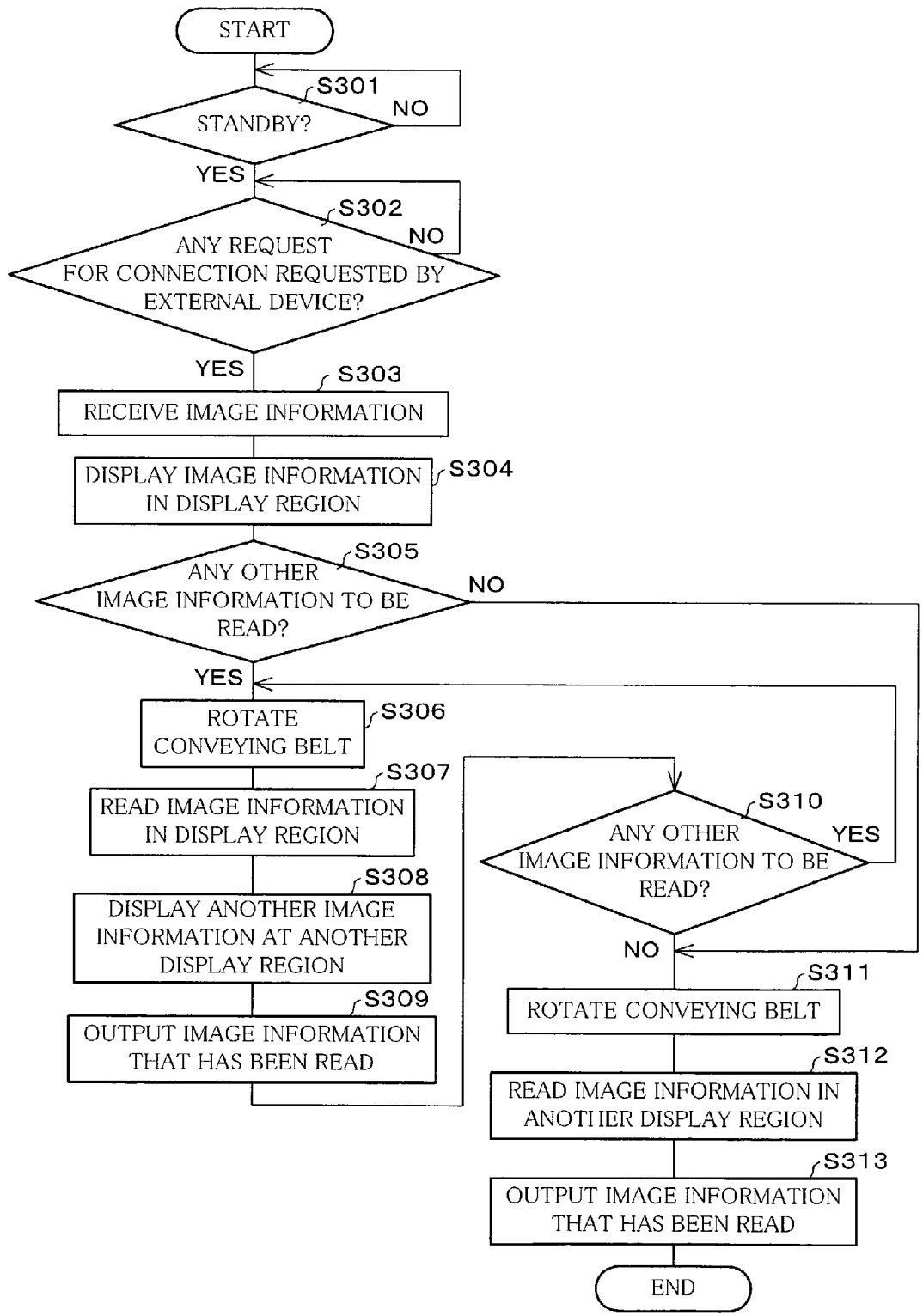
FIG. 15 is a flowchart explaining a method for reading image information by the image reading apparatus in FIG. 12.

With reference to FIGS. 11 and 15, the following describes yet another embodiment of the present invention. For the purpose of explanation, members having the same functions as those of members in First Embodiment and Second Embodiment are labeled with the same referential numerals; therefore, descriptions thereof are omitted.

In the present embodiment, an image reading apparatus including a flexible display section 4 for displaying image information by application of a voltage and/or an electric field thereto, a writing position 3 for writing the image information into the display section 4, and a reading section 7 for optically reading the image information displayed on the display section 4 further includes a conveying section (conveying means) for conveying a document to a reading position; and the conveying section includes the display section 4. Specifically, the conveying section includes a conveying belt for conveying the image information at least to the reading position, and the conveying belt includes the display section 4.

Described below is an example in which the conveying section is an ADF or an SPF, and includes the conveying belt.

First, the SPF including the conveying belt is described. As shown in FIG. 11, the SPF including the conveying belt includes a main conveying roller 39, instead of the document pressing member 28.

In the image reading apparatus of the present embodiment, provided to a surface of the main conveying roller 39 is a conveying belt provided with an electronic sheet 4. Inside the main conveying roller 39, the writing section 3 and an erasing section 40 are provided. Therefore, the image information can be displayed on the electronic sheet 4 provided to the surface of the main conveying roller 39 by applying thereto the voltage and/or the electric field. The main conveying roller can be rotated by a driving source (not shown). Therefore, it is possible to read the image information displayed on the electronic sheet 4.

Figure 12:
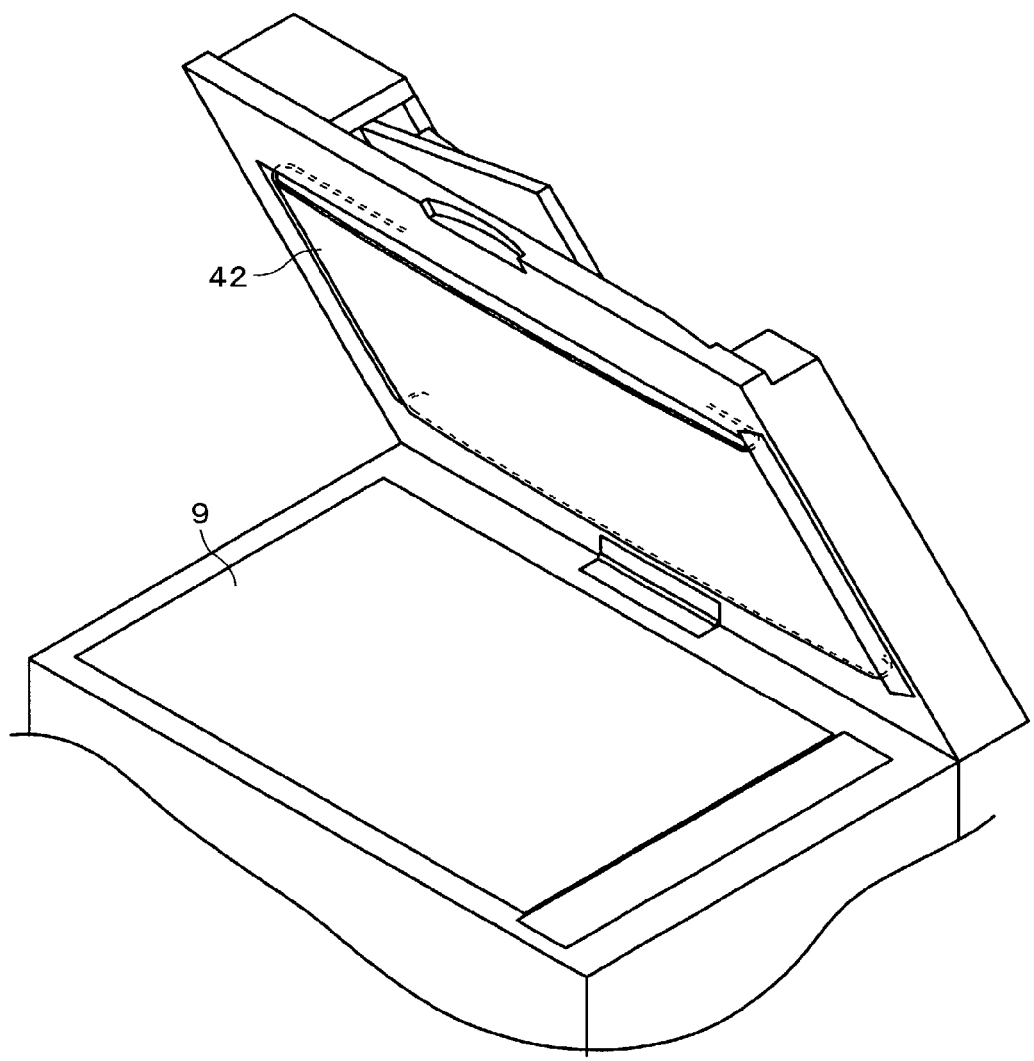
FIG. 12 is a perspective view illustrating an arrangement of an image reading apparatus including an automatic document feeder (ADF).

On the other hand, as shown in FIG. 12, the ADF conveys a widely used document, such as a sheet of paper, to the reading position, at which the document is kept stopped during the reading. Accordingly, a conveying belt 42 is provided at such a position as to substantially face an entire surface of a platen glass 9 provided on a document placement table.

Figure 13:
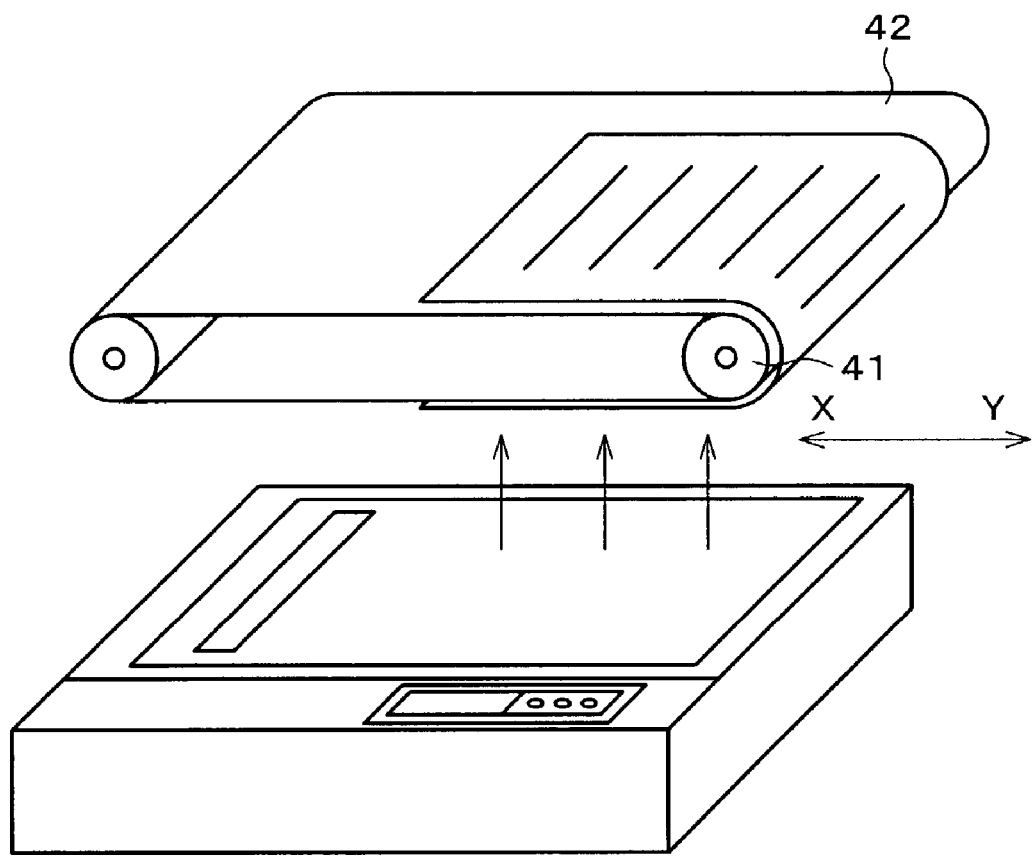
FIG. 13 is a perspective view illustrating an arrangement in which a portion of the conveying belt is the electronic sheet.
Figure 14:
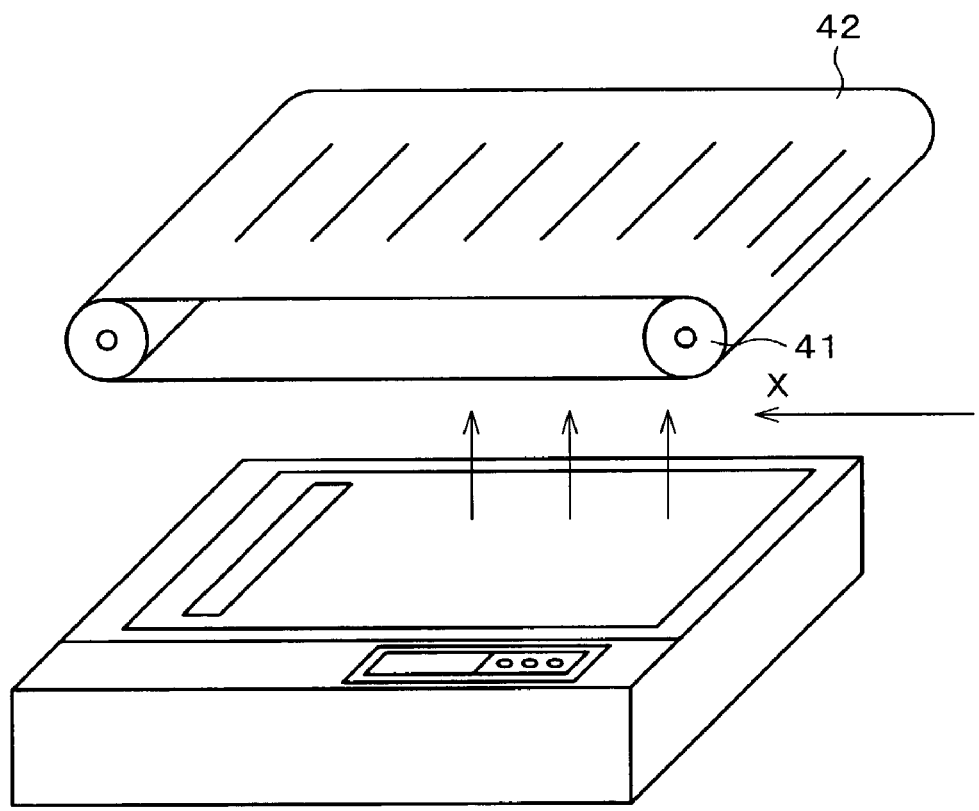
FIG. 14 is perspective view illustrating an arrangement in which the entire conveying belt is the electronic sheet.

In the image reading apparatus of the present embodiment, the conveying belt 42 has the electronic sheet 4, as shown in FIGS. 13 and 14. Specifically, a portion of the conveying belt 42 may be constituted of the electronic sheet 4 as shown in FIG. 13, or the entire conveying belt may be constituted of the electronic sheet 4 as shown in FIG. 14. Moreover, the electronic sheet 4 may be provided to the conveying belt 42. In FIGS. 13 and 14, only the conveying belt 42 of the ADF, the electronic sheet 4, and the reading section 7 are shown.

As shown in FIG. 14, the conveying belt 42 rotates by a roller 41 (in the X-direction in FIG. 14, for example). In a case where the electronic sheet 4 constitutes a portion of the conveying belt 42, as shown in FIG. 13, it is possible to change the moving directions of the conveying belt 42 (the direction into which the conveying belt 42 moves) by changing rotating directions of the roller 41 (i.e. it is possible to move the conveying belt 42 in two directions: the X-direction and the Y-direction in FIG. 13). It should be noted that the conveying belt 42 may be rotated also in the case where the electronic sheet 4 constitutes a portion of the conveying belt 42.

In a vicinity of the conveying belt 42, there are provided the writing section 3 for applying the voltage and/or the electric field to the electronic sheet 4, and the erasing section 40 for erasing the image information displayed on the electronic sheet 4. Where to locate the writing section 3 is not particularly limited; the writing section 3 may be located anywhere so long as the writing section 3 can apply the voltage and/or the electric field to the electronic sheet 4. Accordingly, for example, the writing section 3 may be located inside the roller 41. The same is true with the erasing section 40; where to locate the erasing section 40 is not particularly limited. In order to efficiently read the image information, however, it is preferable that the erasing section 40 is located downstream in the moving direction of the conveying belt 42 (the direction in which the conveying belt 42 moves), with respect to the reading position at which the reading position 7 reads the image information. By locating the erasing section 40 in such position, it is possible to efficiently erase the image information that has been read. Moreover, there may be provided a plurality of the writing sections 3 and/or the erasing sections 40.

It is more preferable that the electronic sheet 4, which constitutes a portion of the conveying belt 42 or the entire conveying belt 42, has a plurality of regions to be read (hereinafter "display regions"). In each display region, the image information that is to be read at once is displayed. By providing the plurality of display sections, it is possible to read one image information and, simultaneously, write another image information. Moreover, in order to provide the plurality of display regions, a plurality of electronic sheets 4 may be used. By providing the plurality of display regions as such, it is possible to read the image information from one electronic sheet 4 (display region), while writing next image information into a next electronic sheet 4 (display region). As a result, it is possible to read the image information smoothly. In reading the image information, such an electronic sheet 4 as to have one display region may be used, for example. In this case, the following operations are to be repeated: the writing section 3 writes image information into the electronic sheet 4, the reading section 7 reads the image information, and the writing section 3 reads another image information.

With reference to the flowchart in FIG. 15, the following describes a process of reading the image information transmitted from a portable communication device 2 or the like, and printing out the image information, in a case where a portion of the conveying belt 42 of the ADF or the entire conveying belt 42 is constituted of the electronic sheet 4, and an image reading apparatus in which the electronic sheet 4 has a plurality of display regions (two display regions, in the following) is connected to an image forming apparatus. In the description below, the two display regions are a display region A and a display region B.

First, a control section 1 judges whether or not the ADF is on standby (S301). Then, the control section 1 judges whether or not there is any request for connection requested by the portable communication device 2 (S302). If there is any request for connection requested by the portable communication device 2, the control section 1 operates a communication section 5 so as to receive the image information transmitted from the portable communication device 2 (S303). Afterwards, the control section 1 operates the writing section 3 so as to display the image information on the display region A of the electronic sheet 4 (S304).

Next, the control section 1 judges whether or not there is further image information to be read (S305). Specifically, the control section 1 judges whether or not plural sets of image information have been transmitted from the portable communication device 2. If there are plural sets of image information to be read, the control section 1 rotates the conveying belt 42 so that the display region A, into which the image information has been written, is moved to the reading position (S306). At this time, the display region B is moved to such a position as to allow the writing section 3 to write another set of image information.

The control section 1 then operates the reading section 7 so as to read the image information displayed on the display region A (S307).

At the same time as S307 is performed, the control section 1 operates the writing section 3 so as to display said another image information on the display region B of the electronic sheet 4 (S308). Specifically, the control section 1 operates the writing section 3 so as to write said another image information into the display region B. Then, the control section 1 transmits, to the image forming apparatus, the image information that has been read, so as to cause the image forming apparatus to output (print out) the image information (S309).

When the image information in the display region A has been read in S307 and said another image information has been displayed in the display region B in S308, the control section 1 judges whether or not there is still further image information to be read (S310). If it is judged in S310 that there is still further image information to be read, the process turns back to S306. If it is judged in S310 that there is no further image information to be read, the control section 1 operates the driving source for the conveying belt 42 in order to rotate the conveying belt 42, so that the display region B, into which said another image information has been written, is moved to the reading position B (S311). Then, the control section 1 operates the reading section 7 so as to read said another image information displayed on the display region B (S312), and outputs said another image information, which has been read, to the image forming apparatus (S313). The process is terminated at this point.

If it is judged in S305 that there is no further image information to be read, the process goes on to S310.

In a case where one image information has already been written into the electronic sheet 4, it is more preferable that said one image information is erased before another image information is written into the electronic sheet 4.

As described above, by consisting of the electronic sheet 4, a part of the conveying belt 42 or the entire conveying belt 42, it becomes easier to read plural sets of image information successively. Moreover, the image reading apparatus of the present embodiment can be arranged by simply modifying a part (the conveying belt) of the conventional ADF or SPF. Further, because reading of a widely used document, such as a sheet of paper, is not hindered by this arrangement, the image reading apparatus can be suitably used.

Moreover, by reading one of the two electronic sheets 4 while writing into the other of the two electronic sheets 4, it is no longer necessary to wait before reading until writing is finished. As a result, documents can be read more smoothly.

A size of the electronic sheet 4, which has a long length, is not limited to that of two sheets of document put together. As long as the image reading apparatus does not become too large, the electronic sheet 4 may have a length of three or four sheets put together. In this way, it is possible to attain a faster reading process.

The image reading apparatus of the present invention as described above can be applied to a conventional image reading apparatus by providing the conventional image reading apparatus with the writing section 3 for writing image information into the electronic sheet 4, the communication section 5, and the like.

Moreover, the image reading apparatus of the present invention may be installed in an image forming apparatus. Further, with the image reading apparatus of the present invention installed in an analog copying machine that does not have a printer function, it is possible to output electronic image information by using light from the electronic sheet 4, specifically, by directly leading, to a photoreceptor, the light from the document at the reading section 7 (an arrangement of the analog copying device).

By using the portable communication device 2, such as a mobile phone and a portable terminal, various image information can be obtained without difficulty, for example, away from home. Recently, the portable communication device 2 is often connected to a network, such as the Internet. Therefore, more diversified image information can be obtained.

However, because the portable communication device 2 is designed to be taken along (carried along), the portable communication device has few functions other than main functions, such as transmission and receipt of information, for example. Thus, in outputting (printing out) the image information in the portable communication device 2 by a printer, for example, the portable communication device 2 is not capable of converting the image information to be printed out into data suitable for the printer, such as data in a GDI format. Therefore, it is difficult to read the image information displayed on or stored in the portable communication device 2.

In the image reading apparatus of the present embodiment, the image information displayed on or stored in the portable communication device 2 is displayed, without conversion, at the display section 4, so that the displayed image information is read. Then, the image information that has been read is outputted by the image forming apparatus (printer). Therefore, there is no need to convert the image information into a data in a format suitable for the printer.

Further, by causing the display section 4 to display the image information to be outputted, it is possible to confirm suitability of the image information with a printer sheet, a kind of font and a font size, a size of the image information, for example. In this way, an error in outputting the image information can be prevented.

The image reading apparatus of the present invention for reading the image information displayed on the electronic sheet 4 may have such an arrangement as to include the writing section 3 for causing the electronic sheet 4 to display the image information by applying thereto the voltage and/or the electric field, and the reading section 7 for optically reading the image information displayed on the electronic sheet 4.

In this arrangement, it is more preferable that the writing section 3 is adapted to include the communication means for receiving the image information transmitted from the portable communication device 2, and to write the received image information into the electronic sheet 4.

An image reading apparatus of the present invention includes: display means for displaying image information by application of a voltage and/or an electric field; writing means for writing the image information into the display means by applying the voltage and/or the electric field to the display means; and reading means for optically reading the image information displayed on the display means, the display means having flexibility.

The display means is a medium in which image information can be written, erased, and rewritten, in accordance with an electric signal. Specifically, the display means displays image information by being subjected to a voltage and/or an electric field (i.e. in accordance with an electronic signal applied thereto). Examples of the display means are an electronic sheet (electronic paper) an organic EL, and the like.

The writing means is capable of writing, into the display means, image information obtained by various communication means, such as Bluetooth and the like. Specifically, the writing means applies a voltage and/or an electric field to the display means so as to cause the display section to display the image information.

In this arrangement, the display means has flexibility (i.e. the display means is flexible). Therefore, when the display means is placed on a platen glass, which functions as a document placement table, the platen glass will not be damaged. This makes it possible to suitably read the image information displayed on the display means.

Moreover, the display means in this arrangement can be more easily handled than in a conventional arrangement where the display means is a liquid crystal panel. Specifically, a liquid crystal display device is detachably provided in a conventional arrangement. In this case, the liquid crystal display device cannot be handled easily because, for example, it is necessary in providing and separating the liquid crystal display device to make sure that, for example, the liquid crystal display device do not strongly touch the platen glass. In the present invention, by using the display means having flexibility, it is more unlikely that the platen glass or the like is damaged. Therefore, the display means can be handled more easily.

The display means has flexibility to such an extent as to be capable of displaying image information while the display means is bent. In other words, the display means is so flexible that the display means can be conveyed by an automatic document conveying device, for example.

It is more preferable that the image reading apparatus of the present invention further includes communication means for receiving the image information transmitted from an external device, the writing means writing the image information received by the communication means.

With this arrangement, the display section is capable of displaying various image information, because it is possible that the image information transmitted from the external device is received, and is written into the display means by the writing means.

It is more preferable that, in the image reading apparatus of the present invention, the external device is a portable communication device.

The portable communication device is a portable small device capable of communicating with an external device. Specific examples of the portable communication device are a mobile phone, a portable small computer, and the like. The portable communication device has no output device for forming an image, such as a connecting terminal for a printer, and a printer driver, because of a size thereof, or in favor of portability.

With this arrangement, it is possible to receive the image information from the portable communication device via the communication means widely used in the portable communication device, such as Bluetooth, and then transmit, by the communication means, the received image information to the display means, so as to read the image information displayed on the display means. In this manner, in a case where the image information that has been read is to be printed out, it is possible to easily print out the image information in the portable communication device.

Moreover, it is possible to easily read, via the display means, image information in a device such as the portable communication device, which is not suitable for having a printer function or a data conversion function. Accordingly, by receiving, by the communication means, the image information displayed on or stored in the portable communication device such as a mobile phone or a portable terminal, for example, the image information in the portable communication device can be easily read without converting the image information into a specific data format in the portable communication device.

In general, the portable communication device does not have a function of converting image information, for example, into data in the GDI format, which is for an image forming apparatus (printer) in which the image information received from the portable communication device is to be printed out. Therefore, it is necessary to convert, in the image forming apparatus, the image information into a data format, such as the GDI format, which is for printing out. In the arrangement above, in the image reading apparatus of the present invention, the display means, such as an electronic sheet, displays the image information which is received from the portable communication device without being converted into a data format suitable for printing out, and this image information is subsequently read. It is easy to cause the display means to display the image information.

As a result, it is possible to read, by using the reading means and without converting the image information into a special data format, the image information transmitted from the portable communication device. Moreover, for example, a complex machine in which the image reading apparatus of the present invention is combined with the image forming apparatus is capable of outputting (printing out) the image information received from the portable communication device, even if there is no information processing means such a personal computer. Moreover, by causing the display means to display the image information to be printed out, it is possible to confirm the compatibility of the image information with the printer sheet in terms of an image size, the kind of font and the font size, and the size of the image information, for example. Because of this, it is possible to prevent an error in printing out the image information.

In the image reading apparatus of the present invention, it is preferable that the display means is provided to a cover of a document placement table of the reading means.

In this arrangement, the display means is provided to the cover of the document placement table of the reading means. The cover is a document pressing member for pressing a widely used document, such as a sheet of paper, so that the document is not displaced while being read. In the following description, the cover of the document placement table is the document pressing member. Accordingly, for example, because the display means is integrated with the document pressing member, it is not necessary to detach the display means when a widely used document, such as a sheet of paper, is to be read. Therefore, it is possible to read, without complex adjustment, image information recorded on a widely used document, such as a sheet of paper, or image information stored in the display means. Moreover, in a case where the display means is used as the document pressing member, the flexibility of the display means ensures that the display means does not damage the platen glass of the document placement table by strongly touching the platen glass. Furthermore, by constituting a portion of the document pressing member of the display means, the image reading apparatus can be arranged more simply, and can be handled more easily. It should be noted that the document pressing member may be that of an automatic document conveying device.

It is more preferable that, in the image reading apparatus of the present invention, the display means is movable, and that the image reading apparatus further includes conveying means for conveying the display means to a reading position at which the reading means reads the image information.

In this arrangement, the image reading apparatus includes the conveying means for conveying the display means to the reading position at which the image information is to be read. In this way, it is not necessary to keep the display means always fixed at the reading position. Moreover, when image information recorded on a widely used document such as a sheet of paper is to be read, the display means does not hinder reading of the document. Accordingly, it is possible to read, without complex adjustment, image information recorded on a widely used document, such as a sheet of paper, or image information stored in the display means. In other words, because it is not necessary to keep the display means fixed at the reading position, even if the image information displayed on the display means and the image information stored in the conventional device, such as a sheet of paper, are to be read in succession, each image information can be suitably read.

Moreover, by using a conventional automatic document conveying device as the conveying means, for example, the present invention can be carried out by merely improving the automatic document conveying device, without modifying the arrangement of the reading means and the like.

It is more preferable that, in the image reading apparatus of the present invention, the writing means is located on a conveying path of the conveying means for conveying the display means.

With this arrangement, it is possible to write the image information while the display means is being conveyed to the reading position for the reading means.

It is more preferable that, in the image reading apparatus of the present invention, the reading means reads the displayed image information at the reading position which is different from a writing position at which the writing means writes the image information into the display means, and the conveying means conveys the display means between the writing position and the reading position.

In this arrangement, the writing means applies the voltage and/or the electric field to the display means so as to display the image information on the display means, and then the display means moves to the reading position which is different from the writing position so that the reading means reads the image information displayed on the display means.

With this arrangement, because reading and writing are performed at the different positions, one set of image information can be written while another set of image information is being read. As a result, it is possible to read the image information at a higher speed.

It is more preferable that, in the image reading apparatus of the present invention, the display means has at least a first display region and a second display region, and in a case where plural sets of image information are to be read, the reading means reads one set of the image information displayed on the first display region, while the writing means writes another set of the image information into the second display region.

The display means having at least the first display region and the second display region may be a display means having more than one display means, each of which is capable of displaying image information to be read in one reading operation, or a display means having one display means capable of displaying image information to be read in more than one reading operations. The image information to be read in one reading operation is the image information that is read in one scanning operation by the reading means. Accordingly, the display region is the region from which image information can be read in one reading operation. Specifically, the display means having more than one reading regions may be a display means that is larger than a size of two reading regions put together laterally or longitudinally, or a display means that is larger than a size of several display regions put together in one direction.

In a case where the electronic sheet is used as the display means, for example, a plurality of the electronic sheets may be put together, or one electronic sheet may be divided into a plurality of display regions.

With the arrangement above, plural sets of image information can be read at a higher speed, because it is possible to read one set of the image information, while simultaneously writing another set of the image information that is to be read next.

It is more preferable that, in the image reading apparatus of the present invention, the conveying means is capable of conveying the display means in a reading direction in which the reading means reads the image information and in a direction opposite thereto.

In other words, the image reading apparatus of the present invention has such an arrangement in which the conveying means is capable of conveying the display means so that the display means is moved back and forth above the reading means. The reading direction is the direction in which the reading means reads the display means that is in a stationary state.

In this arrangement, the conveying means is capable of conveying the display means having more than one display regions in the reading direction and the direction opposite thereto (i.e. in the direction in which the display device is to be conveyed, and the direction opposite thereto). As a result, it is possible to move the display regions of the display means from/to the writing position and the reading position. The display means can be easily conveyed in this manner by an automatic document conveying device, such as the ADF or the SPF.

It is more preferable that, in the image reading apparatus of the present invention, the display means is formed in a shape of an endless belt.

The conveying means rotates the display means in the reading direction for the image information. Accordingly, the display means is moved from/to the writing position and the reading position. The display means can be easily conveyed in this manner by using the display means for a document conveying belt of the ADF or the SPF.

In this arrangement, a first set of image information is written into the first display region of the display means having the shape of endless belt. Then, the display means is conveyed to the reading position, so that the first set of image information is read. While the first set of image information is being read, a second set of image information, which is to be read next, can be written into the second display region. The first display region having the first set of image information that has been read is returned to the writing position by way of rotation, so that a third set of image information can be written into the first display region. In this manner, plural sets of image information can be successively read at a higher speed.

Moreover, it is easy to control the image reading apparatus, because the conveying belt of the automatic document conveying device, such as the ADF or the SPF, should be rotated only in a predetermined direction.

It is more preferable that, in the image reading apparatus of the present invention, the conveying means includes the display means formed in a shape of an endless belt, and the conveying belt has the display means.

The conveying belt is adapted to convey a document to the reading position, and to pass over the reading position. In the arrangement above, the conveying belt of the conveying means has the display means. Specifically, the display means is provided to the conveying belt, or the display means constitutes a portion of the conveying belt or the entire conveying belt. With this arrangement, because the image information displayed on the display means can be moved to the reading position without requiring a new driving source or the like, it is possible to read the image information without requiring a new driving source or the like.

Moreover, the present invention can be easily carried out because it is only necessary to improve the conveying belt of a conventional automatic document conveying device.

Further, it is possible to successively read plural sets of image information in a case where the display means has a plurality of display regions.

It is more preferable that the image reading apparatus of the present invention further includes erasing means for erasing the image information displayed on the display means.

With this arrangement, it is possible to keep confidentiality of stored data by sequentially erasing, from the display means, the image information finished with reading. At the same time, it is possible to shorten a time required to write next data.

It is more preferable that, in the image reading apparatus of the present invention, the display means is an electronic sheet.

The electronic sheet is a thin, flexible, and rewritable medium. A characteristic of the electronic sheet is that the electronic sheet keeps displaying image information (display content) even when no electricity is supplied to the electronic sheet, until a rewrite signal for next image information or an erase signal is supplied thereto.

There are various ways to display image information; for example, one way of displaying image information is to apply a voltage and/or an electric field to the electronic sheet in accordance with the image signal, so that electrically charged colored particles are attached to a display surface.

By using the electronic sheet, which can be conveyed in a bent state, and into which image information can be rewritten, it is possible to read displayed image information without damaging the platen glass. Further, the electronic sheet is advantageous in that the electronic sheet is high contrast and does not consume much electricity.

In the case where the electronic sheet is provided to a document pressing member of a copying machine or a scanner, a suitable background color (white in a copying device; black in a scanner) can be set in accordance with whether the electronic sheet is used in a copying machine or a scanner.

It is more preferable that, in the image reading apparatus of the present invention, the electronic sheet has an electrode, on a reverse side of a display surface thereof, for being subjected to the voltage.

By providing the electrode on the reverse side of the display surface of the electronic sheet, it is possible to apply the voltage to the electronic sheet by causing the electronic sheet and the writing means to contact with each other at a predetermined position. As a result, because information can be updated and rewritten as needed, it is possible to display and copy the information in real time.

It is more preferable that, in the image reading apparatus of the present invention, the electrode is disposed substantially in parallel with a moving direction of the electronic sheet (the direction in which the electronic sheet is to be conveyed), in a case where the electronic sheet is to be conveyed by the conveying means.

By disposing a plurality of belt-shaped electrodes on the reverse side of the display surface of the electronic sheet substantially in parallel with a reading direction for the electronic sheet (i.e. the direction in which the electronic sheet is to be conveyed), it is possible to keep the electronic sheet and the writing means always in contact with each other while the electronic sheet is being conveyed. In this way, it is possible to write the image information while conveying the electronic sheet. As a result, it is no longer necessary to spare a time for writing in addition to a time for conveying; therefore, a net image reading speed can be further increased.

The image forming apparatus of the present invention includes the image reading apparatus.

With this arrangement, because the image forming apparatus includes the image reading apparatus, it is possible to output (print out) the image information displayed on the display means (i.e. the image information read by the reading means). Moreover, it is possible to more easily and suitably print out such image information displayed on or stored in a portable communication device which requires data conversion or the like so as to be suitably printed out.

An image reading method of the present invention includes the steps of: causing a display means having flexibility to display image information by applying thereto a voltage and/ or an electric field; conveying the display means to a reading position at which the image information is to be read; and optically reading the image information displayed on the display means.

In this arrangement, the image information displayed on the displaying means by applying the electric signal thereto is optically read. Because the display means has flexibility (i.e. the display means is flexible), the platen glass of the document placement table will not be damaged, for example. Therefore, the display means can be easily handled, and the image information can be read easily. Moreover, because the actual image information is displayed before being read, it is possible to easily confirm the size of the image information to be read, for example.

It is more preferable that, in the image reading method of the present invention, a plurality of the display means are sequentially conveyed to the reading position in the step of conveying.

With this arrangement, it is possible to successively read the image information at a higher speed, because the display means can be sequentially conveyed to the reading position.

It is more preferable that the image reading method of the present invention further includes the step of writing the image information while conveying the display means to the reading position at which the image information is to be read.

By writing the image information while the display means is being conveyed, it is no longer necessary to spare the time for writing in addition to the time for conveying; therefore, the net image reading speed can be further increased.

In the image reading method of the present invention including the steps of causing a display means having flexibility to display image information by applying thereto a voltage and/or an electric field, conveying the display means to a reading position at which the image information is to be read, and optically reading the image information displayed on the display means, the display means has at least a first display region and a second display region, and one set of the image information displayed on the first display region is read, while another set of the image information is written into the second display region by applying thereto the voltage and/or the electric field.

With this arrangement, the image information can be read at a higher speed because the image information is read from and written into different display regions simultaneously. Therefore, in a case where plural sets of image information are to be read, a net reading time can be shortened.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. An image reading apparatus that reads image information from an external device that is external to the image reading apparatus, the image reading apparatus comprising:
   a communication means for receiving the image information being communicated from the external device;
   a display means for optically displaying images therefrom, the images being displayed by application of a voltage and/or an electric field thereto;
   wherein the display means is flexible along at least one axis thereof, where the images being optically displayed are displayed from the display means;
   writing means, operably coupled to the communication means, for writing the image information transmitted by the external device into the display means; and
   reading means for optically reading the images being displayed by the display means; and
   wherein the image information communicated from the external device is read by the image reading apparatus when the reading means reads the images being displayed by the display means wherein the display means is configured so as to include at least two display regions each display region being capable of selectively displaying images therefrom; and in a case where plural sets of image information from the external device are to be read, the reading means reads one set of image information being displayed on one of the at least two display regions, while the writing means writes another set of image information into another one of the at least two display regions.

2. The image reading apparatus as set in claim 1, wherein the writing means applies the voltage or field to the display means that corresponds to the image information received by the communication means.

3. The image reading apparatus as set forth in claim 2, wherein:
   the external device is a portable communication device.

4. The image reading apparatus as set forth in claim 1, wherein:
   the reading means includes a document placement table having a cover; and
   the display means is embodied in a cover of the document placement table.

5. The image reading apparatus as set forth in claim 1, further comprising:
   a conveying means for conveying the display means including the flexible member to a reading position at which the reading means reads the image information.

6. The image reading apparatus as set forth in claim 5, wherein:
   the writing means is located on a conveying path of the conveying means, through which the display means is to be conveyed.

7. The image reading apparatus as set forth in claim 5, wherein:
   the reading means reads the displayed image information at the reading position which is different from a writing position at which the writing means writes the image information into the display means; and
   the conveying means conveys the display means from/to the writing position and to/from the reading position.

8. The image reading apparatus as set forth in claim 5, wherein:
   the conveying means is configured so as be capable of conveying the display means in a reading direction in which the reading means reads the image information and in a direction opposite thereto.

9. The image reading apparatus as set forth in claim 5, wherein:
   the display means is configured so as to form an endless belt.

10. The image reading apparatus as set forth in claim 5, wherein:
    the conveying means includes a conveying belt having a shape of an endless belt; and
    the display means is embodied in the conveying belt.

11. The image reading apparatus as set forth in claim 1, further comprising:
    erasing means for erasing the image information previously written in the display means.

12. The image reading apparatus as set forth in claim 1, wherein:
    the display means is a flexible electronic sheet having a display surface from which is displayed the images written to the electronic sheet.

13. The image reading apparatus as set forth in claim 12, wherein:
    the electronic sheet has an electrode, on a reverse side of the display surface thereof, for receiving the voltage for writing image information to the electronic sheet.

14. The image reading apparatus as set forth in claim 5, wherein:

the display means is a flexible electronic sheet having an electrode, on a reverse side of a display surface thereof, the electrode for receiving the voltage for writing image information in the electronic sheet, the display surface being the surface from which is displayed the image information written to the electronic sheet; and the electrode is disposed substantially in parallel with a moving direction of the electronic sheet, in a case where the electronic sheet is to be conveyed by the conveying means.

15. The image reading apparatus of the claim 1, wherein the external device is communicatively coupled to the image reading apparatus and wherein the image information being communicated from the external device is not in a form that can be read electronically by the image reading apparatus.

16. An image reading method, comprising the steps of:
providing a display means that is flexible along one axis therof, that displays image information responsive to application of voltage or an electric field thereto;

applying a voltage and/or an electric field to a display means corresponding to image information from a device external to the display means so that an image being displayed corresponds to the received image information;

conveying the display means to a reading position at which the image information being displayed on the display means is to be read; and optically reading the image information being displayed by the display means when the display means is at the reading position wherein the display means has at least two display regions; and the step of reading image information displayed on one of the at least two display regions is preformed, while the step of applying the voltage and/or the electric field is being performed to another one of the at least two display regions so as to write another image information into said another one of the at least two display regions.

17. The image reading method as set forth in claim 16, wherein:
a plurality of the display means are sequentially conveyed to the reading position at which the image information is to be read, in the step of conveying the display means.

18. The image reading method as set forth in claim 16, further comprising the step of:
writing the image information received from the external device while the display means is being conveyed to the reading position at which the image information is to be read.

19. An image forming apparatus, comprising:
an image reading apparatus, including:
a communication means for receiving image information transmitted from an external device;
a display means for optically displaying images therefrom, the images being displayed by application of a voltage and/or an electric field thereto;
wherein the display means is flexible along at least one axis thereof, where the images being optically displayed are displayed from the flexible member;
writing means, operably coupled to the communication means, for writing the image information transmitted by the external device into the display means; and
reading means for optically reading the images being displayed by the display means; and
wherein the image information communicated from the external device is read when the reading means reads the images being displayed by the display means.

20. The image forming apparatus of claim 19, further comprising:
a printing means for printing image date read by the reading means.

* * * * *